(12) United States Patent
Pai et al.

(10) Patent No.: US 11,244,335 B2
(45) Date of Patent: Feb. 8, 2022

(54) SERVER AND METHOD FOR DETERMINING IF AN ACCOUNT IN A TRANSACTION REQUEST IS ELIGIBLE FOR A PROMOTION

(71) Applicant: MASTERCARD INTERNATIONAL INCORPORATED, Purchase, NY (US)

(72) Inventors: Shreya Pai, Pune (IN); Shruti Ramnani, Pune (IN); Haseena Parvin Khasim Sab, Pune (IN); Vidit Bhargava, Pune (IN)

( * ) Notice: Subject to any disclaimer, the term of this patent is extended or adjusted under 35 U.S.C. 154(b) by 47 days.

(21) Appl. No.: 16/223,687

(22) Filed: Dec. 18, 2018

(65) Prior Publication Data

US 2019/0188745 A1 Jun. 20, 2019

(30) Foreign Application Priority Data

Dec. 19, 2017 (SG) .............................. 10201710558S
Dec. 3, 2018 (SG) .......................... 10201810833Y

(51) Int. Cl.
| | |
|---|---|
| G06Q 30/00 | (2012.01) |
| G06Q 30/02 | (2012.01) |
| G06F 16/27 | (2019.01) |
| G06Q 20/40 | (2012.01) |
| G06Q 20/38 | (2012.01) |

(52) U.S. Cl.
CPC ......... *G06Q 30/0215* (2013.01); *G06F 16/27* (2019.01); *G06Q 20/387* (2013.01); *G06Q 20/405* (2013.01); *G06Q 30/0207* (2013.01); *G06Q 30/0239* (2013.01)

(58) Field of Classification Search
CPC .............. G06Q 30/02; G06Q 30/0215; G06Q 30/0207; G06Q 30/0239; G06Q 20/405; G06Q 20/387; G06F 16/27
USPC .. 705/14.1, 14.3, 14.39, 14.23, 14.51, 14.17
See application file for complete search history.

(56) References Cited

U.S. PATENT DOCUMENTS

| | | | | |
|---|---|---|---|---|
| 2009/0266884 | A1* | 10/2009 | Killian | ............... G06Q 20/0855 235/380 |
| 2013/0204697 | A1* | 8/2013 | Boal | ...................... G06Q 30/02 705/14.51 |
| 2014/0058815 | A1 | 2/2014 | Hiremath et al. | |

(Continued)

FOREIGN PATENT DOCUMENTS

WO  WO2015/175893  11/2015

*Primary Examiner* — Sun M Li

(57) ABSTRACT

In one aspect, there is provided a server for determining if an account in a transaction request is eligible for a promotion, the server operatively connected to a Payment Service Provider (PSP) device, and the server comprising at least one processor; and at least one memory including computer program code; the at least one memory and the computer program code configured to, with the at least one processor, cause the server at least to receive, directly from the PSP device, a promotion Application Programming Interface (API) call comprising a transaction request corresponding to a user, the transaction request indicating an account information of an account, the promotion API call established through a connectivity between the PSP device and the server; and determine if the account indicated in the transaction request is one that is eligible for a promotion transaction in response to the receipt of the transaction request.

18 Claims, 22 Drawing Sheets

(56) References Cited

U.S. PATENT DOCUMENTS

| | | | |
|---|---|---|---|
| 2014/0108263 A1* | 4/2014 | Ortiz | G06Q 20/3223 |
| | | | 705/71 |
| 2014/0188586 A1 | 7/2014 | Carpenter et al. | |
| 2014/0324566 A1 | 10/2014 | Mankoff | |
| 2015/0134528 A1 | 5/2015 | Fineman et al. | |
| 2015/0193803 A1* | 7/2015 | Zamer | G06Q 30/0222 |
| | | | 705/14.23 |

* cited by examiner

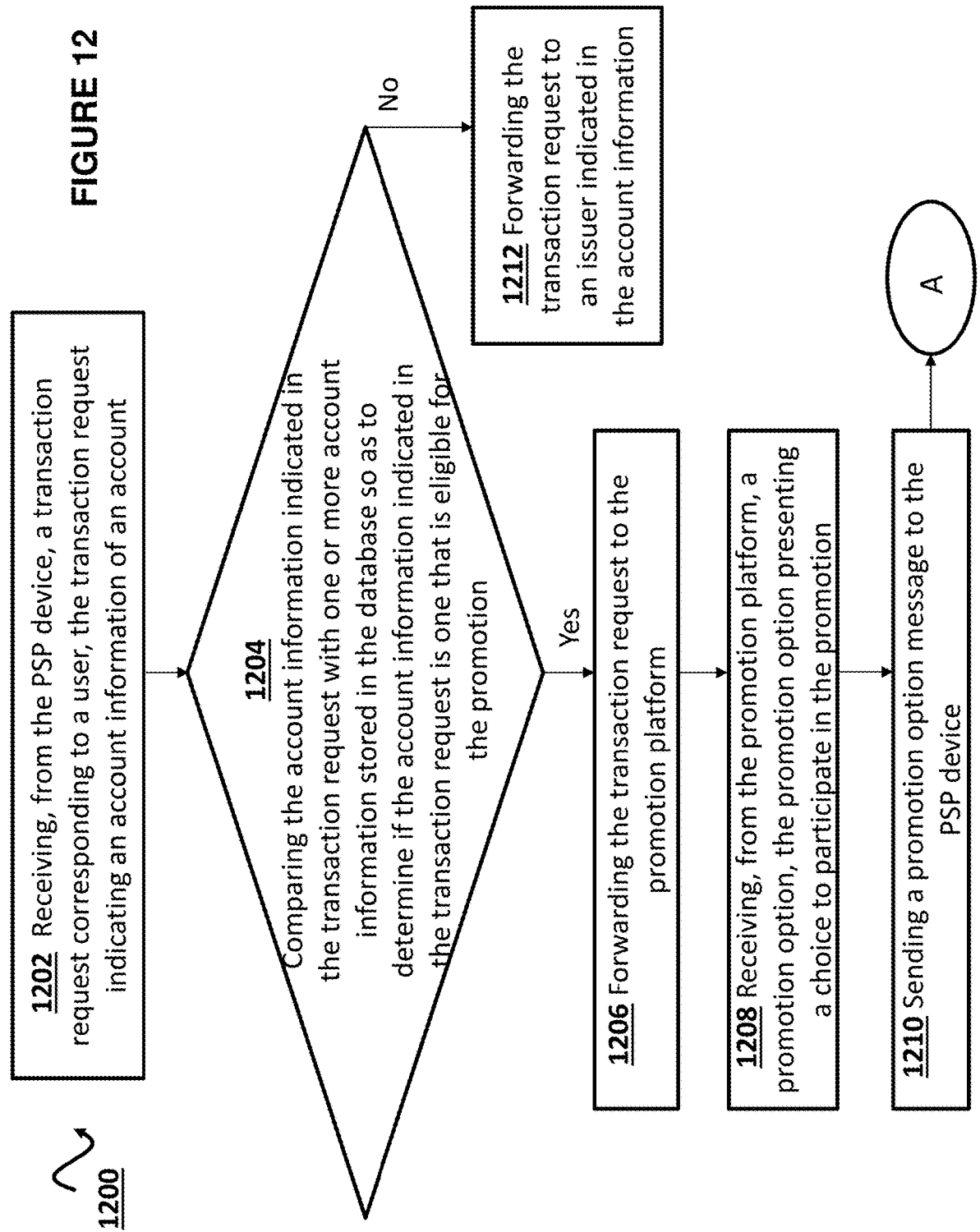

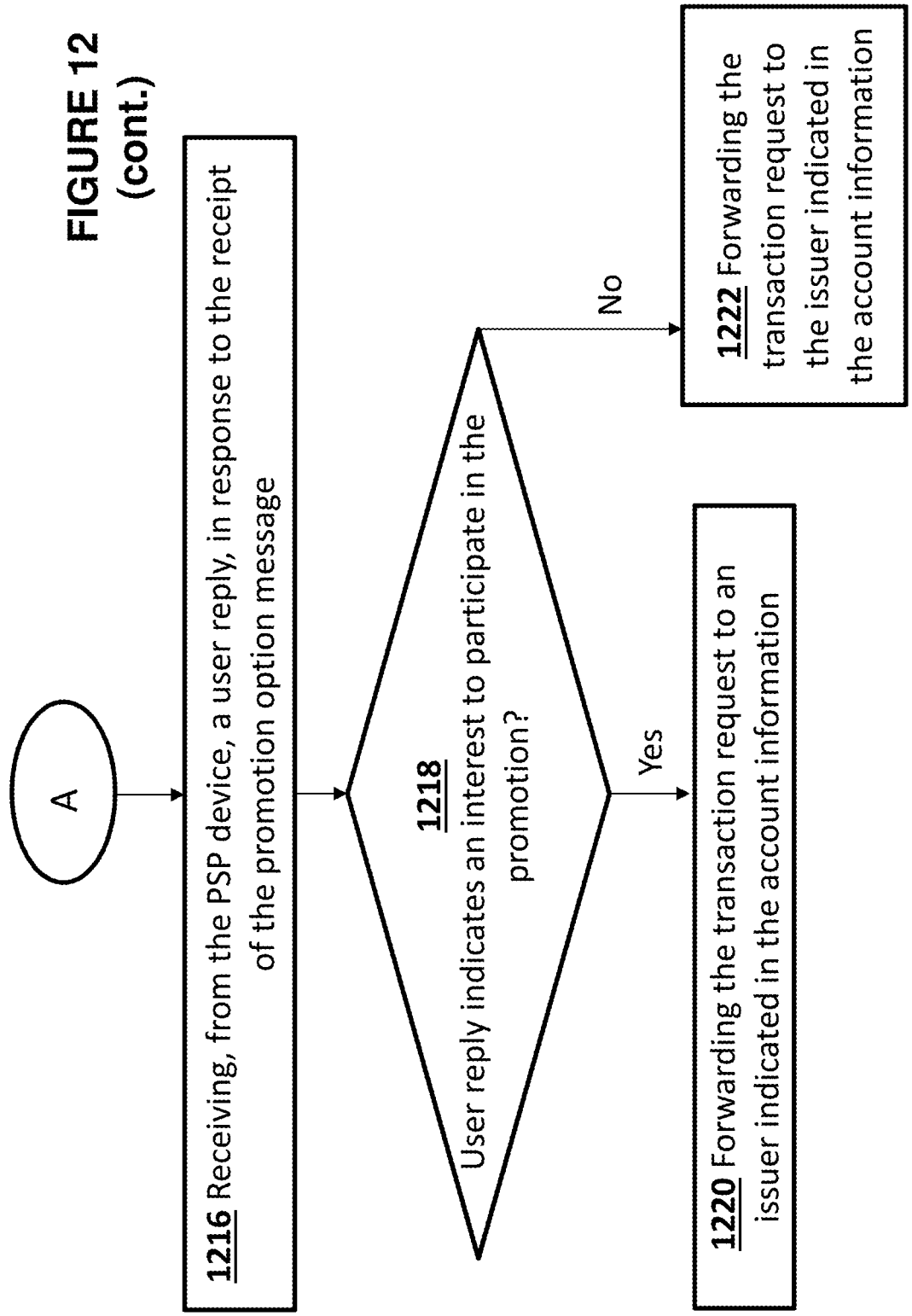

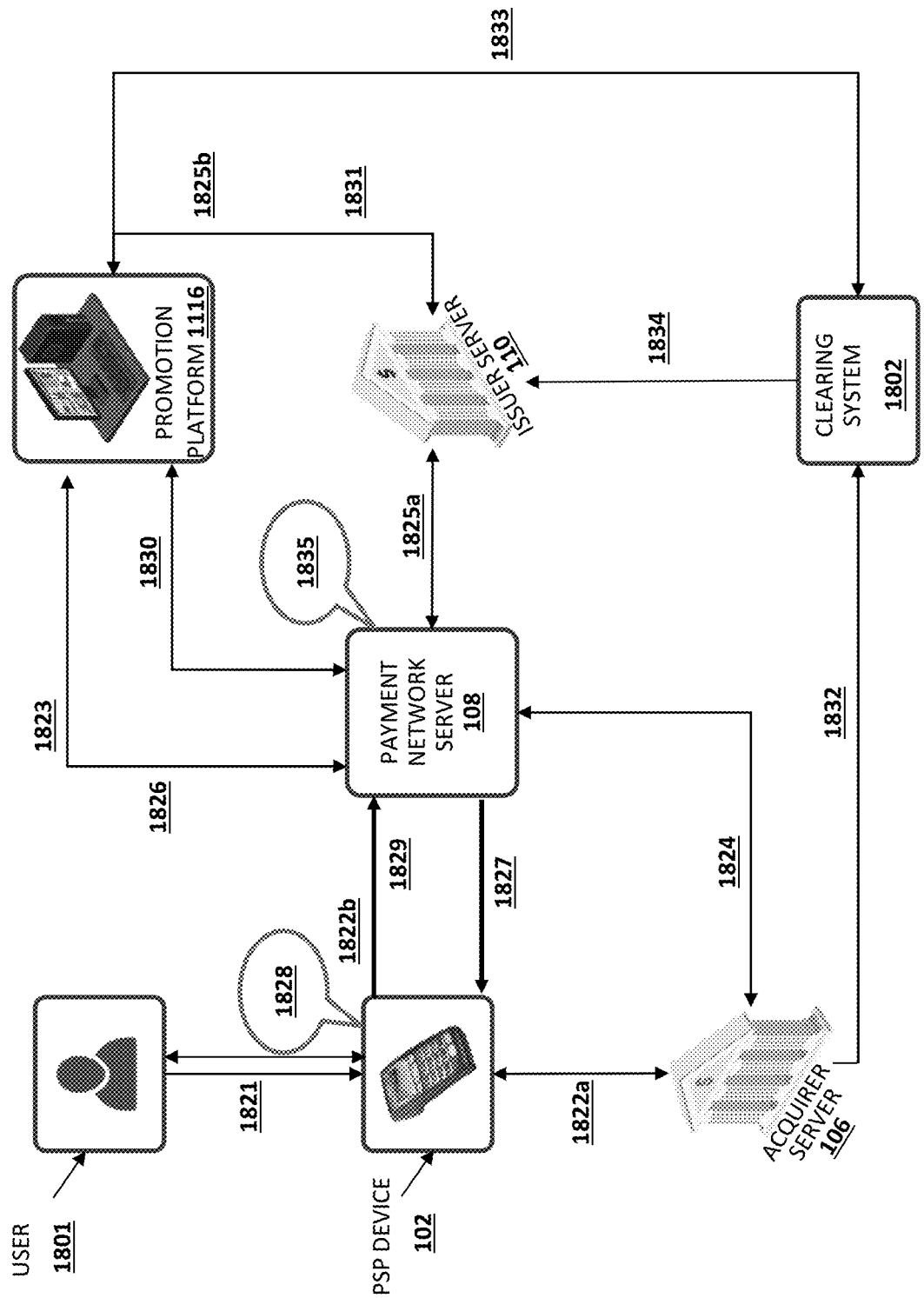

SERVER AND METHOD FOR DETERMINING IF AN ACCOUNT IN A TRANSACTION REQUEST IS ELIGIBLE FOR A PROMOTION

CROSS-REFERENCE TO RELATED APPLICATIONS

This application claims the benefit of, and priority to, Singapore Application No. 10201710558S, filed on Dec. 19, 2017, and Singapore Application 10201810833Y, filed on Dec. 3, 2018. The entire disclosure of each of the above applications is incorporated herein by reference.

FIELD

The present disclosure relates broadly, but not exclusively, to servers, specifically to a payment service provider and a payment network provider, and methods for adaptively managing promotions from one or more issuers and for determining if an account in a transaction request is eligible for a promotion transaction.

BACKGROUND

This section provides background information related to the present disclosure which is not necessarily prior art.

Payment service providers (PSP) manage merchant-operated, consumer-facing and self-service payment systems to various industries, namely financial, retail, hospitality, petroleum, government and healthcare industries. PSP solutions comprise PSP payment devices that run its own operating systems, security and encryption software, and are typically located at the merchants for transmitting consumer-initiated transaction requests to the relevant parties. For example, where payment cards or digital wallets are used, the PSP may typically forward the consumer-initiated transaction requests to the payment facilitators facilitating the payment cards or digital wallets.

Often, the financial institutions who issue these payment cards may offer promotions or offers that are applicable to a merchant or consumer. Such promotion messages are often sent from the financial institutions to the payment facilitators. Since existing payment facilitators and PSPs are different entities running on different systems, such promotion messages may not be made known to a customer in a timely manner when the customer initiates the request. That is, the customer may be using a payment card or digital wallet issued by the financial institution that is holding a promotion that is applicable to the request (either for the customer or the merchant). Consequently, the customer loses the opportunity to benefit from the promotion.

In some instances, the PSP may forward the transaction request indicating details of the issuing financial institutions to the payment facilitator to find out if the issuing financial institutions are holding any promotions. In today's commerce, there is a high amount of transaction requests that are communicated between the PSP server and the payment facilitator server, making this solution impractical and not scalable.

A need therefore exists to provide methods for adaptively managing promotions from one or more issuers that addresses one or more of the above problems.

Further, in other instances, the PSP, or in some cases a user device, may be configured to forward transaction requests indicating details of the account to the payment network server to find out if the account indicated in the transaction request is one that is eligible for the promotion transaction so that promotion options may be offered to payers (customers). Likewise, this causes a huge volume of unnecessary traffic on the payment facilitator server and the promotion platform, making this solution impractical and not scalable.

A need therefore also exists to provide methods for determining if an account in a transaction request is eligible for a promotion that addresses one or more of the above problems.

Furthermore, other desirable features and characteristics will become apparent from the subsequent detailed description and the appended claims, taken in conjunction with the accompanying drawings and this background of the disclosure.

SUMMARY

This section provides a general summary of the disclosure, and is not a comprehensive disclosure of its full scope or all of its features. Aspects and embodiments of the disclosure are set out in the accompanying claims.

According to a first aspect of the present disclosure, there is provided a server for determining if an account in a transaction request is eligible for a promotion, the server operatively connected to a Payment Service Provider (PSP) device, and the server comprising at least one processor; and at least one memory including computer program code; the at least one memory and the computer program code configured to, with the at least one processor, cause the server at least to receive, directly from the PSP device, a promotion Application Programming Interface (API) call comprising a transaction request corresponding to a user, the transaction request indicating an account information of an account, the promotion API call established through a connectivity between the PSP device and the server; and determine if the account indicated in the transaction request is one that is eligible for a promotion transaction in response to the receipt of the transaction request.

According to a second aspect of the present disclosure, there is provided a method for determining if an account in a transaction request is eligible for a promotion, the method comprising receiving, directly from the PSP device, a promotion Application Programming Interface (API) call comprising a transaction request corresponding to a user, the transaction request indicating an account information of an account, the promotion API call established through a connectivity between the PSP device and the server; and determining if the account indicated in the transaction request is one that is eligible for a promotion transaction in response to the receipt of the transaction request.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, embodiments of the present disclosure will be better understood and readily apparent to one of ordinary skill in the art from the following written description, by way of example only, and in conjunction with the drawings, in which:

FIG. 12 shows a flow chart illustrating a computer-implemented method for determining if an account in a transaction request is eligible for a promotion according to various embodiments.

FIG. 18 shows an example of a transaction flow in a promotion portal server such as a payment network server.

Corresponding reference numerals indicate corresponding parts throughout the several views of the drawings.

DETAILED DESCRIPTION

Figure 1A:
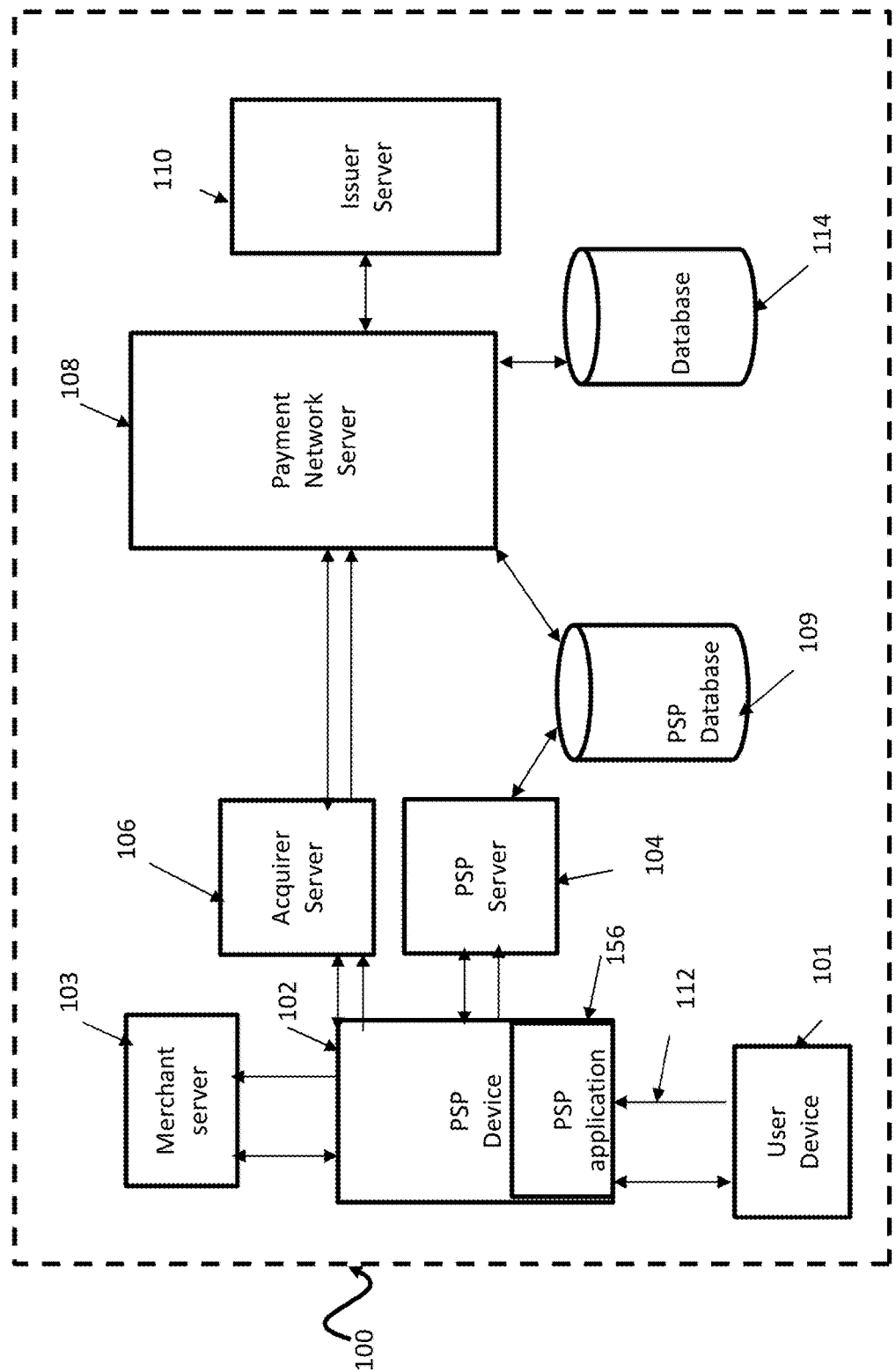
FIGS. 1A and 1B show a block diagram of a transaction system within which transaction data and account identifier can be received.

Embodiments will be described, by way of example only, with reference to the drawings. The description and specific examples included herein are intended for purposes of illustration only and are not intended to limit the scope of the present disclosure.

Various embodiments provide devices and methods for adaptively managing promotions from one or more issuers using a PSP application (or a mobile PSP module).

A PSP application is provided in association with a PSP device for shopping at a payee (or a merchant). Often payers (customers) may be eligible for promotions by virtue of issuers who have issued their accounts to them. Typically, PSP is one that facilitates payment for a payee and is not configured to receive information relating to the issuers. Hence, for the purposes of finding out if an issuer indicated in a transaction request message is offering a promotion, each transaction request message received at the PSP application has to be forwarded to a payment network application which facilitates payment between the payer and the issuer. In other words, typically the PSP does not have access to information that has been provided to the payment network server, let alone updated information.

According to various embodiments, devices and methods are provided with which a payer can initiate a transaction request, using a PSP application executing on a PSP device, to purchase one or more products at a premise of a payee (or merchant). The payer can be informed of real-time updates of on-going promotions.

Advantageously, various embodiments can provide the payer an option to participate in an on-going promotion, including latest promotions for which they are eligible. This helps to save money for the payer and makes the whole shopping experience fuss-free.

Additionally or alternatively, various embodiments provide devices and methods for determining if an account indicated in a transaction request is eligible for an on-going promotion. In various embodiments, the devices include, among other examples, an XML Gateway or a payment network server.

An XML Gateway is typically the point of entry for transactions that are forwarded from external devices, like PSP devices and user devices, and is managed by the payment network server. Typically, the XML Gateway is used to manage traffic flowing in and out of a service-oriented architecture and is not configured to receive information relating to the accounts. Hence, for the purpose of finding out if an account indicated in a transaction request is eligible for a promotion, each transaction request message received at the PSP application or user device application has to be forwarded to a promotion platform which manages the promotion transactions between the payer and the issuer. In other words, typically the XML Gateway does not have access to information that has been provided to the promotion platform.

Similarly, a payment network server is typically associated with a payment facilitator which operates to process transactions and to clear and settle funds for payments between two entities. For the purpose of finding out if an account indicated in a transaction request is eligible for a promotion, each transaction request message received at the PSP application or user device application has to be forwarded to a promotion platform which manages the promotion transactions between the payer and the issuer.

According to various embodiments in the present disclosure, devices and methods are provided with which a payer can initiate a transaction request, using a PSP application executing on a PSP device or a user device application executing on a user device, to purchase one or more products.

Advantageously, various embodiments can filter incoming transaction requests initiated by payers before forwarding only the transaction requests that are eligible for a promotion to the promotion platform. This helps to reduce the volume of non-eligible transactions to the promotion platform which in turn, reduces unnecessary processing and CPU usage on the promotion platform. In particular, the filtering is done by a promotion portal server which may be managed by the payment network server. Furthermore, this solution will not demand any agreement from any external entities, such as the PSPs, since the solution remains managed by the payment network server, or the entity who manages the rules and standards of the accounts together with the issuers. Hence, this reduces the transaction time and improves customer experience by reducing terminal slowness.

A PSP (payment service provider) application is a module or program associated with a transaction function, e.g., shopping, and may be one that supports payment to settle the transaction. For example, the PSP application may be an extension of an existing payment module, e.g., Masterpass®, which is a digital payment service from Mastercard® that provides fast, simple and secure digital payments across devices and channels. A PSP application is typically managed by a PSP who is a third party that allows merchants to accept a wide variety of payments through a single channel. A PSP application typically works with acquiring banks (payment processors) to manage the entire transaction process from start to finish. This means that the PSP is responsible from the moment a customer (user) initiates a transaction request or inputs his payment account details, to the moment the funds, necessary to complete the transaction request, appear in the merchant's bank account. Alternatively, the PSP application is one that is suitable to switch to another application, e.g., a payment network application that is managed by a different entity, after it has received the data from the user, so as to perform additional functions. The PSP application is one that is typically installed on a merchant device (e.g., a point-of-sale device).

A payment network server typically is associated with a payment facilitator. For example, the payment network server may be the Banknet® network operated by Mastercard®. The payment facilitator (e.g., Mastercard®) may be an entity (e.g., a company or organization) who operates to process transactions and to clear and settle funds for payments between two entities (e.g., two banks). The payment network server may include one or more computing devices that are used for processing transactions. In specific implementations, the payment network server is further configured to perform additional operations. For example, the payment network server may be configured to update the database whenever a financial institution (e.g., an issuer) offers a promotion for a certain account.

A payment network application is a module or program associated with a transaction function, e.g., updating or facilitating of promotional messages, and may be one that supports payment to settle the transaction. For example, the payment network application is one that is managed by the payment network server and is configured to manage (receive, store or forward) promotional messages that are received from another entity (e.g., issuer).

A promotion portal server typically is associated with a payment facilitator. The promotion portal server may include one or more computing devices that are used for processing transactions. In specific implementations, the promotion portal server is further configured to perform additional operations. For example, the promotion portal server may be configured to filter incoming transactions based on predetermined rules.

An XML Gateway is an entry point of all transactions that are forwarded from external devices, like PSP devices and user devices, which is internal to the payment facilitator (e.g., Mastercard®). The XML Gateway may be configured to manage (receive, filter or forward) a transaction request from a PSP, or a user device, based on a set of predetermined criteria. It may also be operatively connected to a database to receive information from a promotion platform, such as an installments platform.

A user device application is a module or program associated with a transaction function, e.g., shopping, and may be one that supports payment to settle the transaction. For example, the user device application may be an application installed by a user onto a user device which is a digital payment service that provides fast, simple and secure digital payments across devices and channels. A user device application typically works with acquiring banks (payment processors) to manage the entire transaction process from start to finish. This means that the user device is responsible from the moment a customer (user) initiates a transaction request or inputs their payment account details, to the moment the funds, necessary to complete the transaction request, appear in the merchant's bank account. Alternatively, the user device application is one that is suitable to switch to another application, e.g., a payment network application that is managed by a different entity, after it has received the data from the user, so as to perform additional functions. The user device application is one that is typically installed on a user device (e.g., a mobile device).

A promotion platform typically is associated with a payment facilitator that is in communication with an issuer server that may provide promotions. The promotion platform may include one or more computing devices that are used for processing promotion transactions between the payer and the issuer. In specific implementations, the promotion platform is further configured to perform additional operations. For example, the promotion platform may be configured to update the database whenever an account becomes eligible for a promotion or whenever new promotion criteria are determined by the issuer or the payment facilitator. The promotion platform may be further configured to send a promotion option upon receipt of transaction requests that are eligible for promotions.

Various credit cards and debit cards of a user may be managed in a user's e-wallet (electronic wallet), which may be referred to as "wallet" for short. An example of an e-wallet is Masterpass®, which is a digital payment service from Mastercard® that provides fast, simple and secure digital payments across devices and channels. Masterpass®, for example, provides an interface for selecting which card of a plurality of cards that a user holds to use for a certain transaction and allows a convenient cashless payment.

Embodiments of the present disclosures will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "analysing", "determining", "replacing", "generating", "initializing", "outputting", "receiving", "retrieving", "identifying", "predicting" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices, such as magnetic or optical disks, memory chips, or other storage devices suitable for interfacing with a computer. The computer readable medium may also include a hard-wired medium, such as exemplified in the Internet system, or wireless medium, such as exemplified in the GSM mobile telephone system. The computer program when loaded and executed on such a computer effectively results in an apparatus that implements the steps of the method(s) herein.

In embodiments of the present disclosure, use of the term 'server' may mean a single computing device or at least a computer network of interconnected computing devices which operate together to perform a particular function. In other words, the server may be contained within a single hardware unit or be distributed among several or many different hardware units.

In the following description, a user (or a customer) may refer to one who has an account identifier. In specific embodiments, the account identifier may be linked to various financial institutions. For example, a user may sign up for a universal account so as to be linked to various financial institutions. The user is also a customer who initiates a transaction with a merchant. In one example, the user (or customer) may initiate the transaction with the merchant to buy goods and/or services from the merchant using their universal account. In an embodiment, the transaction is a payment transaction. In other words, effecting the transaction involves a payment between parties to the transaction.

FIG. 1A illustrates a block diagram of a transaction system 100 within which transaction data can be received.

The system 100 comprises a user device 101 in communication with a payment service provider (PSP) device 102 in communication with a payment service providers (PSP) server 104.

For the purposes of various embodiments, the user device 101 is adapted to be used by a user (or customer) who is a party to a transaction that occurs between the user and the merchant. The user device 101 may be a fixed (wired) computing device or a wireless (portable) computing device. In specific implementations, the user device 101 may be a handheld or portable or mobile device carried or used by the customer, or may refer to other types of electronic devices, such as a personal computer, a land-line telephone or an interactive voice response (IVR) system, and the like. The mobile device may be a device, such as a mobile phone, a laptop computer, a personal digital computer (PDA), a mobile computer, a portable music player (such as an iPod™, and the like).

The PSP device 102 typically is a merchant device that has a PSP application 156 installed onto it. The PSP device 102 is associated with the merchant who is also a party to the transaction that occurs between the user device 101 and the PSP device 102 through the transaction. The PSP device 102 may be a point-of-sale (POS) terminal, an automatic teller machine (ATM), a personal computer, a computer server (hosting a website, for example), an IVR system, a land-line telephone, or any type of mobile device, such as a mobile phone, a personal digital assistant (PDA), a laptop computer, a tablet computer, and the like. For various embodiments below, the merchant is one whose payment services are managed by the PSP.

The PSP device 102 is also in communication with a merchant server 103, an acquirer server 106 and a PSP server 104. A PSP application 156 (which is installed on the merchant device) typically works with acquiring banks to manage the transaction process from start to finish. This means that the PSP is responsible from the moment a user initiates a transaction request via the user device 101, or inputs their payment account details via the user device 101, to the moment the funds, necessary to complete the transaction request, appear in the merchant's bank account at the acquirer server 106. For the purposes of managing the transaction requests that are received from the user device 101, the PSP device 102 communicates with the merchant server 103 to obtain information relevant to the product to be purchased in the transaction request. Also, the PSP device 102 may be configured to update the merchant server 103 of the transaction requests that it has received via the user device 101.

The PSP device 102 is typically managed by a PSP for merchant-operated, consumer-facing and self-service payment systems adapted for use in various industries, namely financial, retail, hospitality, petroleum, government and healthcare industries. PSP solutions comprise a PSP application 156 that is configured to execute on PSP devices that run its own operating systems, security and encryption software, and are typically located at the merchants for transmitting consumer-initiated transaction requests to the relevant parties. In some instances, the PSP device 102 may replace the merchant device. In other words, it is possible for a merchant to engage the services of the PSP to provide PSP devices on their retail venue, without having to pay for additional merchant devices. For example, where payment cards or digital wallets are used, the PSP may typically forward the consumer-initiated transaction requests to the payment facilitators facilitating the payment cards or digital wallets.

The PSP server 104 typically is associated with the PSP who manages the PSP device 102. As mentioned in the above, the PSP device 102 may be a merchant device having a PSP application 156 or a device managed by the PSP. The PSP device 102 may be a point-of-sale (POS) terminal, an automatic teller machine (ATM), a personal computer, a computer server (hosting a website, for example), an IVR system, a land-line telephone, or any type of mobile device, such as a mobile phone, a personal digital assistant (PDA), a laptop computer, a tablet computer, and the like.

The acquirer server 106 may be associated with an acquirer. It is to be understood that an acquirer may be an entity (e.g., a company or organization) which issues (e.g., establishes, manages, administers) an account (e.g., a financial bank account) of the merchant. Examples of the acquirer include a bank and/or other financial institution. In an embodiment, the acquirer server 106 may include one or more computer networks that are used to establish communication with another server by exchanging messages with and/or passing information to the other server.

Figure 10:
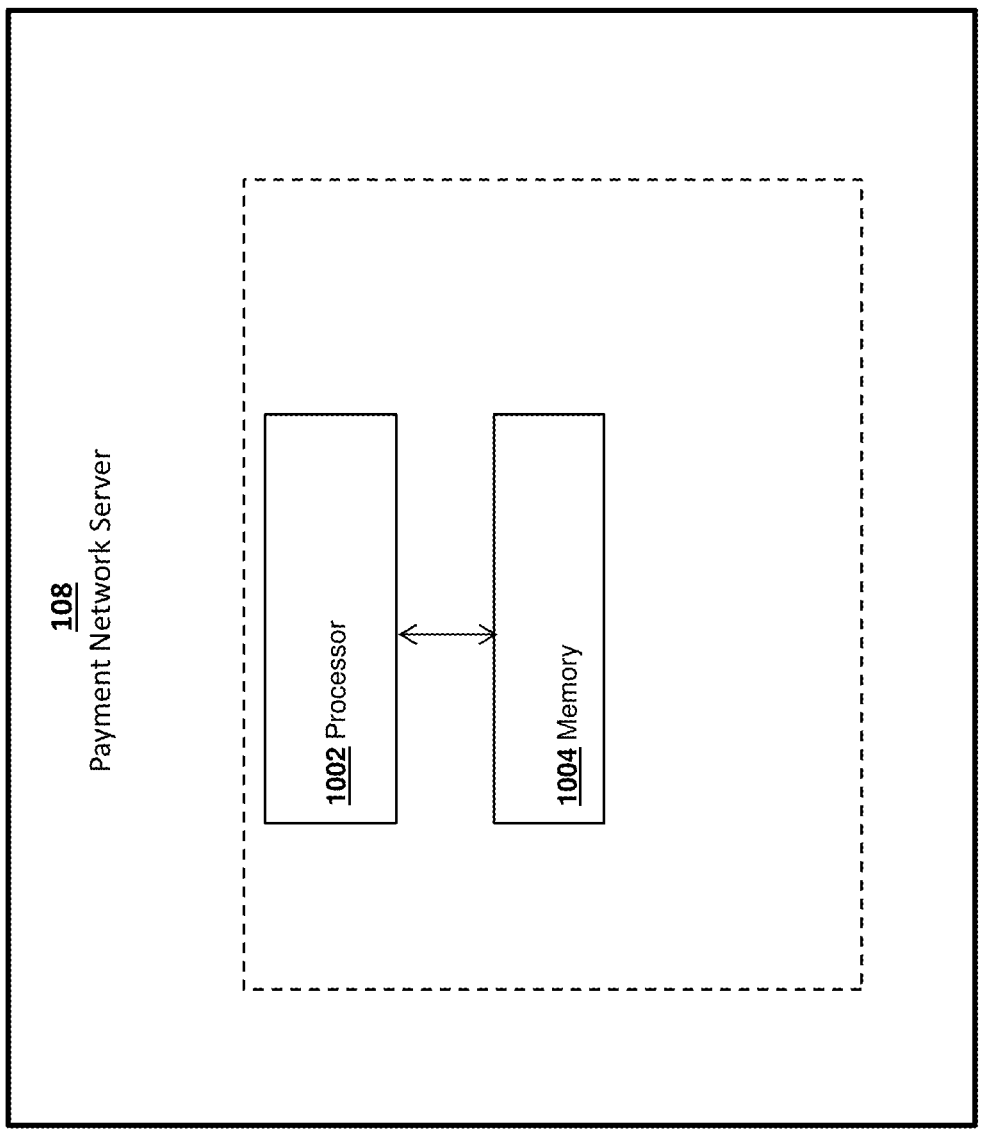
FIG. 10 shows an exemplary computing device to realize a server for the payment network server shown in FIGS. 1A, 1B, 11A and 11B.

The payment network server 108 typically is associated with a payment facilitator. For example, the payment network server 108 may be the Banknet® network operated by Mastercard®. The payment facilitator (e.g., Mastercard®) may be an entity (e.g., a company or organization) who operates to process transactions and to clear and settle funds for payments between two entities (e.g., two banks). The payment network server 108 may include one or more computing devices that are used for processing transactions. An exemplary payment network server 108 is shown in FIG. 10.

The issuer server 110 generally is associated with an issuer and may include one or more computing devices that are used to perform a payment transaction. The issuer may be an entity (e.g., a company or organization) which issues (e.g., establishes, manages, administers) a transaction credential or an account (e.g., a financial bank account). An account may be used at the PSP device 102. The issuer server 110 may be used by the corresponding issuer to manage one or more promotions or offers that may be applicable to an account. For example, an account may be applicable to enjoy a one-time discount off a transaction amount and/or be available to participate in an interest-free installment repayment scheme.

The payment network server 108 may be configured to communicate with, or may include, a database (or a PSP database) 109. The PSP database 109 stores data corresponding to a transaction (or transaction data) that may be retrievable by the PSP server 104. Examples of the data include information relating to an issuer, e.g., if it is offering a promotion.

In other embodiments, the payment network server 108 may also be configured to communicate with, or may include, another database 114. The database 114 may include data corresponding to the PSP database 109. Examples of the data include information relating to an issuer, e.g., if it is offering a promotion. Further details on how these data are managed are described in FIG. 2 below.

The PSP device 102 is capable of wireless communication using a suitable protocol. For example, embodiments may be implemented using PSP devices 102 that are capable of communicating with Wi-Fi/Bluetooth-enabled payment vehicles (e.g., NFC-enabled payment cards). It will be appreciated by a person skilled in the art that depending on the wireless communication protocol used, appropriate handshaking procedures may need to be carried out to establish communication between the PSP device 102 and the payment vehicles. For example, in the case of Bluetooth communication, discovery and pairing of the user device 101 and the PSP device 102 may be carried out to establish communication at the premise of the payee.

In an example, a transaction request (or transaction request message) 112 is generated at the user device 101 and sent to the PSP device 102. The transaction request message 112 is received by the PSP device 102 in response to the customer (or user) making a selection of a good and/or service (or a product) to be purchased from the merchant (or payee). The information relating the good and/or service may be one that is received via the merchant server 103. In other words, the transaction request message 112 relates to a transaction between the user and the merchant, typically at the merchant's retail location (or the payee location). The transaction may be first received via a PSP application 156 (or a PSP module) that works with the infrastructure of the merchant. In specific implementations, the PSP device 102 may be fitted with a wireless communications interface, such as a Near Field Communication (NFC) interface, to enable the PSP device 102 to electronically communicate with a payment card of the payer to perform the transaction. NFC is a set of standards to establish radio communication between devices by bringing them into close proximity, such as only a few centimetres. NFC standards cover communication protocols and data exchange formats, and are based on radio-frequency identification (RFID) technology.

The transaction request message 112 may include an account identifier identifying a user, user data, a type of transaction and transaction data. In other words, each transaction data relates to a transaction and identifies the user and the merchant, generally by way of identifiers of each associated with the user and the merchant respectively. An example of the account identifier is a PAN which refers to a number of digits (or characters) which identify an account issued by an issuer (for example, a bank). For example, in some embodiments an account (e.g., credit account, debit account, pre-paid account) is issued by an issuer pursuant to the Mastercard® International Incorporated rules, and the PAN may be a twelve to nineteen-digit string that identifies both the issuer (e.g., which may be based on the first few digits of the string, for example, the first five to ten digits) and the specific account (e.g., which may be based on some or all of the remaining digits) and its corresponding user. Further, the transaction data may also identify the good and/or service to be purchased and a type or nature of the transaction. The transaction data may further identify a value or price of the good and/or service (e.g., a product), and a corresponding account to be used for the transaction.

For example, an account identifier included in the transaction request message 112 may refer to various types of accounts that are administered by a corresponding one or more issuers, which can be used by the user. The user data may include the name of the user and the date of expiry of the account (if applicable). For some accounts, there may be on-going promotions that are available. Conventionally, each transaction request message 112 is forwarded from the PSP device 102 via the PSP server 104 to the payment network server 108. That is, conventionally, the PSP server 104 does not have the capacity to find out if the account indicated in the transaction request message 112 is applicable for any on-going promotion.

As mentioned above, the role of the payment network server 108 is to facilitate communication between the PSP device 102 and another server (e.g., an issuer server). Therefore, the payment network server 108 may serve as a means through which the PSP server 104 may communicate with the issuer server 110 in a manner that messages may be accepted and forwarded.

Figure 1B:
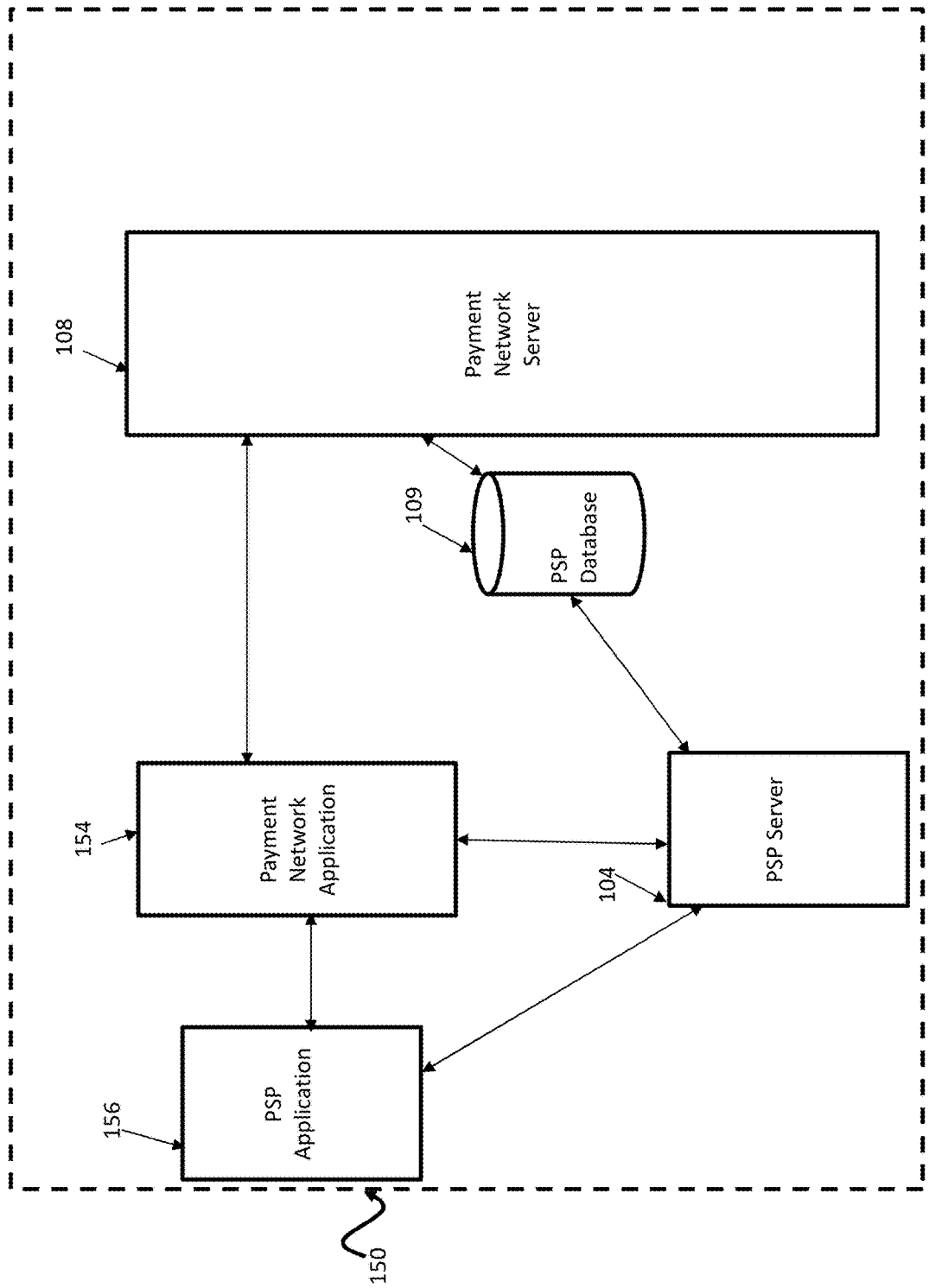

FIG. 1B shows a diagram 150 having a payment network server 108 for processing a transaction request using a payment network application 154 that is configured to communicate with a PSP application 156 managed by a PSP server 104. The payment network server 108 includes a processor configured to ensure that the PSP server 104 gets real-time updates on any offer enrolment. In other words, the PSP server 104 is configured to identify transaction request messages indicating issuers who are offering offers (or promotions) or have on-going offers for some accounts. Advantageously, this ensures that the customer is informed of promotions in a timely manner.

The payment network server 108 is configured to receive, from an issuer server, a promotion message relating to a promotion. Before receiving a further promotion message relating a further promotion, the payment network server 108 is configured to update, the PSP database 109, of the promotion message which is retrievable by the PSP server 104. In other words, the payment network server 108 is one that is configured to update the PSP database 109 in a real-time manner, or whenever the payment network server 108 receives information that an issuer is going to offer a promotion. Additionally, the payment network server 108 may be configured to update a payment network database (e.g., database 114 shown in FIG. 1A) of the promotion message which is retrievable by the payment network server 108 at the same time of updating the PSP database 109. The payment network database 114 may be different and separate from the database 109. The payment network server 108 is configured to update the database 109 when it receives a promotional message from an issuer relating to a promotion. This is done before a further promotion message relating to a further promotion is received so as to provide real-time updates of the promotion messages to the database 109. It may be possible for the payment network server 108 to update the database 114 after updating the database 109, during which a further promotion message may be received. In other words, at a point of time, it may be possible for the database 109 to include at least one more promotion message than the database 114.

The further promotion may refer to an update of an on-going promotion (e.g., instead of a 5% off discount, it may be a further 8% off discount). That is, the further promotion may be one that is offered by the same issuer. Alternatively, the further promotion may be one that is different from an on-going promotion, offered by the same or different issuer. In other words, the payment network server 108 is one that is operatively communicable with one or more issuer servers. In the event that the payment network server 108 receives a further promotion message while it is still updating the database 109, it may hold onto the further promotion message. Alternatively, the payment network server 108 may instruct the payment network application 154 not to receive a further promotion message until the received promotion message has been updated to the database 109.

In response to an update of the PSP database 109, the payment network server 108 may be configured to send a notification message informing the PSP server 104 of the update on the PSP database 109 of the promotion message.

In various embodiments, the PSP application 156 (which may be executing on a PSP device 102) may be configured to receive information relating to the payee. The PSP application 156 may be configured to receive information relating to the payee via NFC, or similar connection. The information will then be forwarded to the PSP server 104 which is one configured to access a PSP database 109 that is updatable by a payment network server 108.

In an embodiment, the PSP server 104 is one that is configured to identify an issuer corresponding to an account indicated in the transaction request message 112. The PSP server 104 may also be configured to determine if there is a promotion message corresponding to the identified issuer in the PSP database 109 so as to determine whether or not the identified issuer is offering an on-going promotion by retrieving relevant information from the PSP database 109.

The PSP database 109 is one that is updated by the payment network server 108 whenever an issuer offers an on-going promotion. Hence, the PSP server 104 may retrieve information from the PSP database 109 to determine if the identified issuer is one that has informed the payment network server 108 that it is going to offer an offer or promotion. For example, if the identified issuer is one that matches the retrieved information from the PSP database 109, it is one that is offering an on-going offer. This may be referred to as an offline check because the PSP server 104 may be configured to conduct this check without being in an active internet communication with the payment network server 108.

In response to the determination of whether the identified issuer is having an offer, the PSP server 104 may forward information including account details of the account indicated in the transaction request message and issuer detail of the identified issuer to the payment network server 108 via the payment network application 154. This may be sent in a manner of a promotion request to the payment network server 108, requesting to participate in a promotion corresponding to the identified issuer. For example, if the PSP server 104 determines that the identified issuer is offering a promotion in the offline check, it may send a promotion request to the payment network server 108 when it is in internet communication with the payment network server 108.

Advantageously, this real time updating of the PSP server 104 is not limited to a specific issuer. Typically, the payment network server 108 facilitates transactions between acquirers and issuers and is configured to receive information relating to the transactions (e.g., promotions by issuers). On the other hand, the PSP server 104 is one that facilitates payment for a merchant and is not configured to receive information relating the issuers. In order for a conventional PSP server to receive updated information relating to an issuer, it requires updating of the existing software and/or hardware of the PSP server 104. Even so, it may be limited to specific issuers, depending on the updates.

Additionally, the payment network server 108 may be configured to determine if the account indicated in the promotion request is permitted to participate in the promotion based on predetermined criteria. While the PSP server 104 may determine if the identified issuer is one that is offering a promotion, it may not be configured to determine if the account to be used for the transaction is one that is eligible for the promotion. The predetermined criteria refers to conditions determined by at least one entity (e.g., an issuer) under which an account may be used for a promotion. The determination may be performed in response to a credibility score, reliability score or confidence score relating to the account based on historical transaction data. Additionally or alternatively, the determination may also be performed based on the type of the account. e.g., whether it corresponds to one having a specific net worth (e.g., a saving account having an amount higher than a predetermined amount).

In response to the determination if the account indicated in the promotion request is permitted to participate in the promotion, the payment network server 108 may send, to the PSP server 104, a payment approval message approving the promotion request when it is determined that the account indicated in the promotion request is permitted to participate in the promotion. Additionally, the payment network server 108 may send, to the PSP server 104, a payment denial message denying the promotion request when it is determined that the account indicated in the promotion request is not permitted to participate in the promotion.

In other words, the PSP server 104 is configured to receive, from the payment network server 108, a payment approval message approving the promotion request indicating that the account indicated in the promotion request is permitted to participate in the promotion. In response to the receipt of the payment approval message, the PSP server 104 may be configured to send, to the PSP device 102, the promotion in response to receiving the payment approval message. In other words, the user may now have an option to participate in a promotion that is being offered by an issuer who has issued their account.

Figure 2:
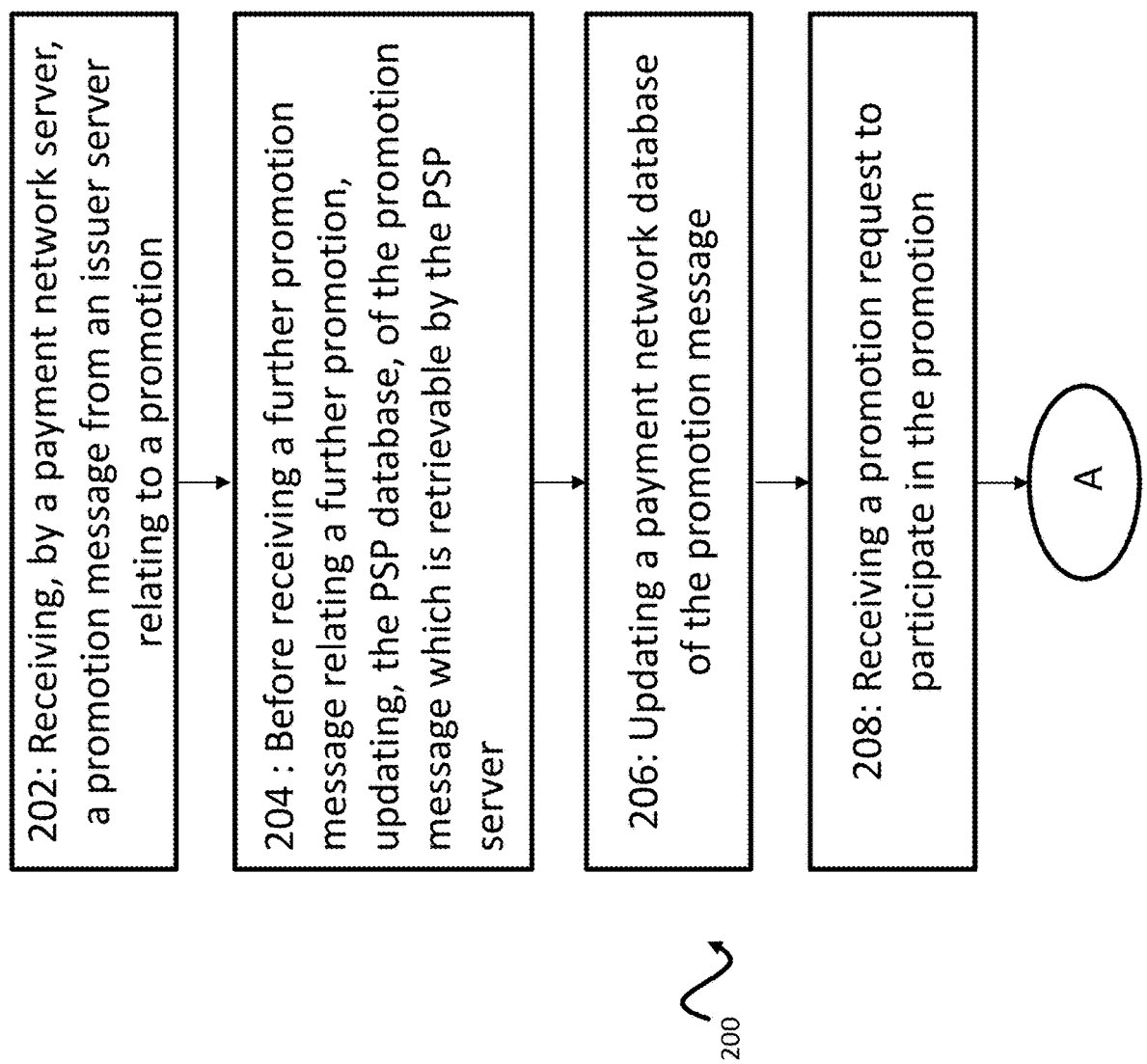
FIG. 2 shows a flow chart illustrating a computer-implemented method for adaptively managing promotions from one or more issuers according to various embodiments.
Figure 2:
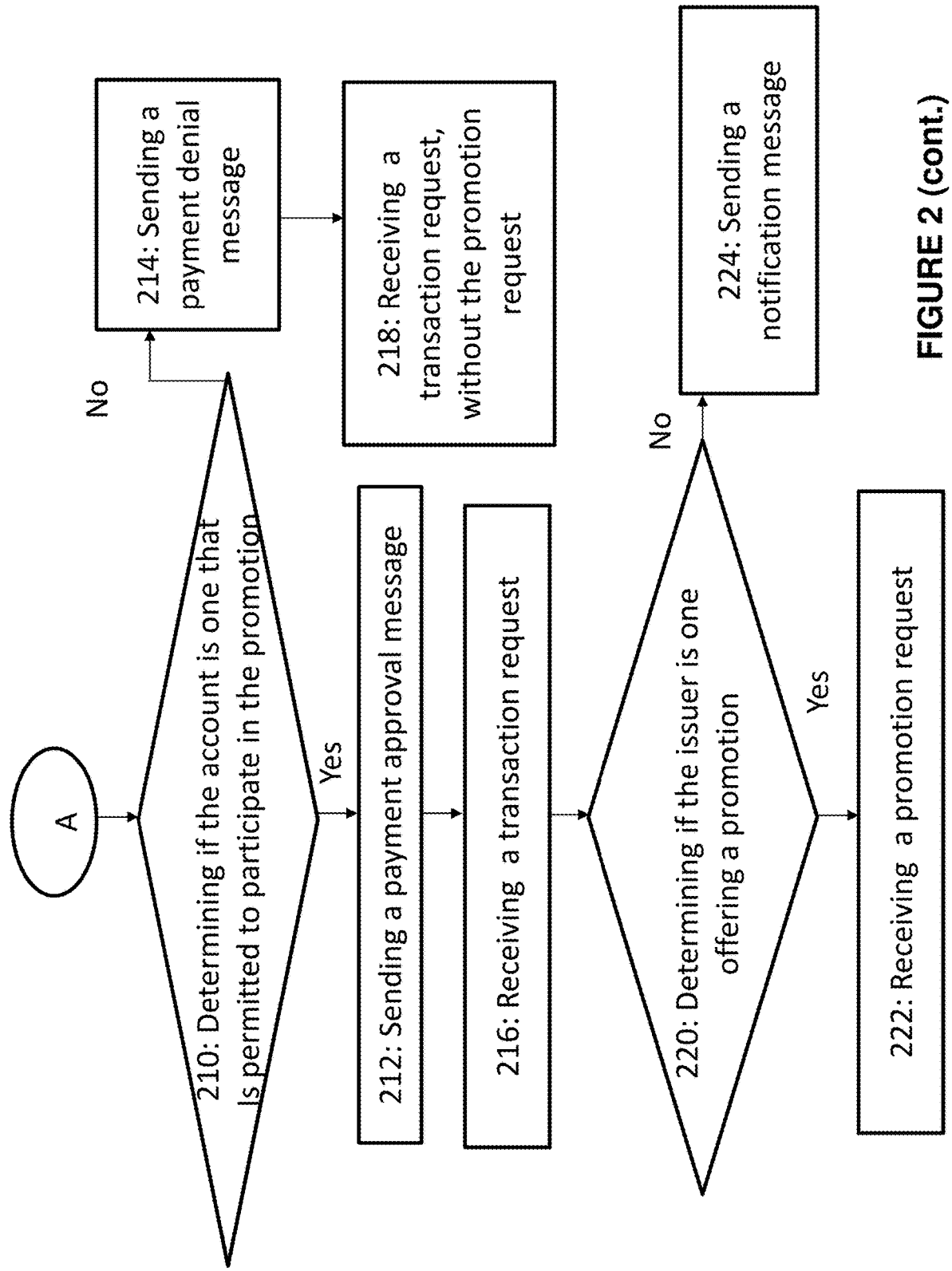

Such a server may be used to implement the method 200 shown in FIG. 2. FIG. 2 shows a flowchart illustrating a method 200 for adaptively managing promotions from one or more issuers according to embodiments of the disclosure.

As shown in FIG. 2, the method 200 broadly includes the following operations.

Step 202: Receiving, by a payment network server, a promotion message from an issuer server relating to a promotion, the payment network server operatively connected to a payment service provider (PSP) server and a PSP database.

Step 204: Before receiving a further promotion message relating to a further promotion, updating, by the payment network server, the promotion message to the PSP database, the promotion message being retrievable by the PSP server.

The method 200 may be performed by one or more purpose-built computing devices, such as the payment network server 108, that is coupled to one or more databases.

At step 202, the method comprises receiving, by a payment network server, a promotion message from an issuer server relating to a promotion. The payment network server is one that is operatively connected to a payment service provider (PSP) server and a PSP database; and before receiving a further promotion message relating to a further promotion, updating, by the payment network server, the promotion message to the PSP database 109, the promotion message being retrievable by the PSP server.

Subsequent to step 202, at step 204, the method further comprises sending, by the payment network server, to the PSP server, a notification message in response to the update on the PSP database of the promotion message, the notification message informing the PSP server of the update on the PSP database of the promotion message before receiving a further promotion message relating to a further promotion. In the event that the further promotion message is received while updating the PSP database, the promotion message is held by the payment network server. Advantageously, this helps the PSP database to be updated in a timely manner of a new promotion message.

Subsequent to step 204, at step 206, the method further comprises updating, by the payment network server, a payment network database of the promotion message which is retrievable by the payment network server.

Subsequent to step 206, at step 208, the method further comprises receiving, at the payment network server, from the PSP server, a promotion request to participate in a promotion corresponding to an identified issuer, the promotion request indicating account details of an account and issuer details of the identified issuer.

Subsequent to step 208, at step 210, the method further comprises determining, by the payment network server, if the account indicated in the promotion request is permitted to participate in the promotion based on predetermined criteria.

At step 212, the method comprises sending, by the payment network server to the PSP server, a payment approval message approving the promotion request when it is determined that the account indicated in the promotion request is permitted to participate in the promotion.

At step 214, the method further comprises sending, by the payment network server to the PSP server, a payment denial message denying the promotion request when it is determined that the account indicated in the promotion request is not permitted to participate in the promotion. In other words, step 214 is an alternative to step 212.

In the event that a payment denial message denying the promotion request is received at step 214, at step 218, the method further comprises receiving a transaction request, without the promotion request.

At step 216, the method further comprises receiving, from a PSP device, a transaction request initiated by a user, the transaction request indicating account details of an account to be used, the PSP device being operatively communicable with the PSP server.

At step 220, the method further comprises determining if the issuer is one who is offering a promotion. That is, the method comprises identifying, by the PSP server, an issuer who has issued the account based on the account details indicated in the transaction request; and determining, by the PSP server, if there is a promotion message corresponding to the identified issuer in the PSP database.

At step 222, the method comprises sending, by the PSP server to the payment network server, a promotion request to participate in a promotion, the promotion request indicating account details of an account and issuer details of the identified issuer corresponding to the promotion. Step 222 may happen if it is determined in step 220 that the issuer is one who is offering a promotion.

At step 224, the method comprises sending, by the PSP server to the payment network server, a notification message notifying that the issuer who has issued the account is not offering any promotion because it is determined at step 220 that there is no promotion message corresponding to the identified issuer in the PSP database. The method further comprises receiving, by the PSP server from the payment network server, a payment approval message approving the promotion request indicating that the account indicated in the promotion request is permitted to participate in the promotion. Alternatively, the method further comprises sending, by the PSP server, the promotion to the PSP device in response to receiving the payment approval message.

Figure 3:
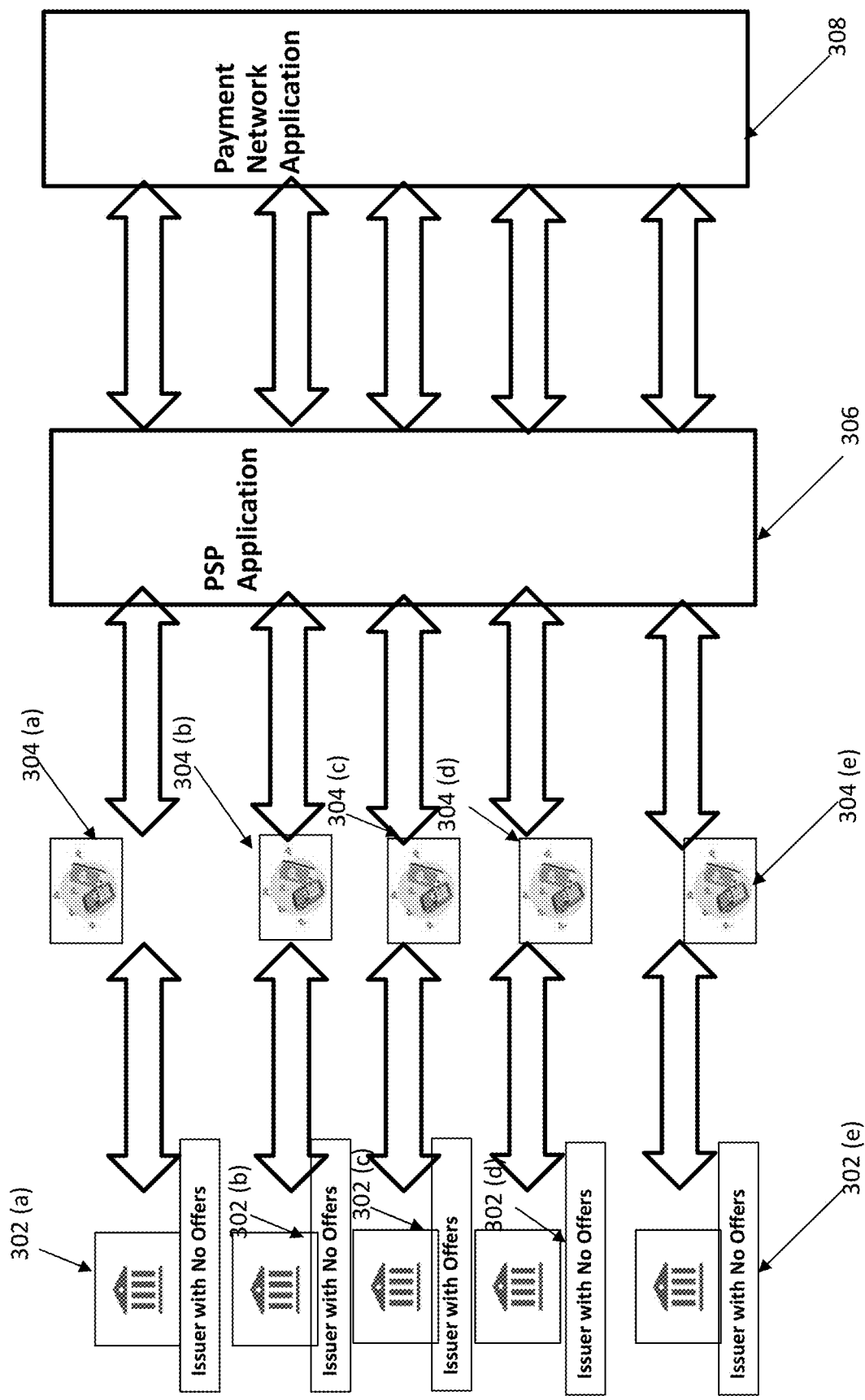
FIG. 3 (PRIOR ART) shows how conventional PSP applications typically manage promotion messages from one or more issuers.

FIG. 3 shows how conventional PSP applications typically manage promotion messages from one or more issuers. For example, one or more PSP applications 306 executing on one or more PSP devices 304(a)-(e) may each receive a transaction request message indicating a corresponding issuer 302(a)-(e). In order to determine if the one or more issuers 302(a)-(e) is currently offering a promotion, the PSP applications 306 has to forward all received transaction request messages to a payment network application 308.

Figure 4:
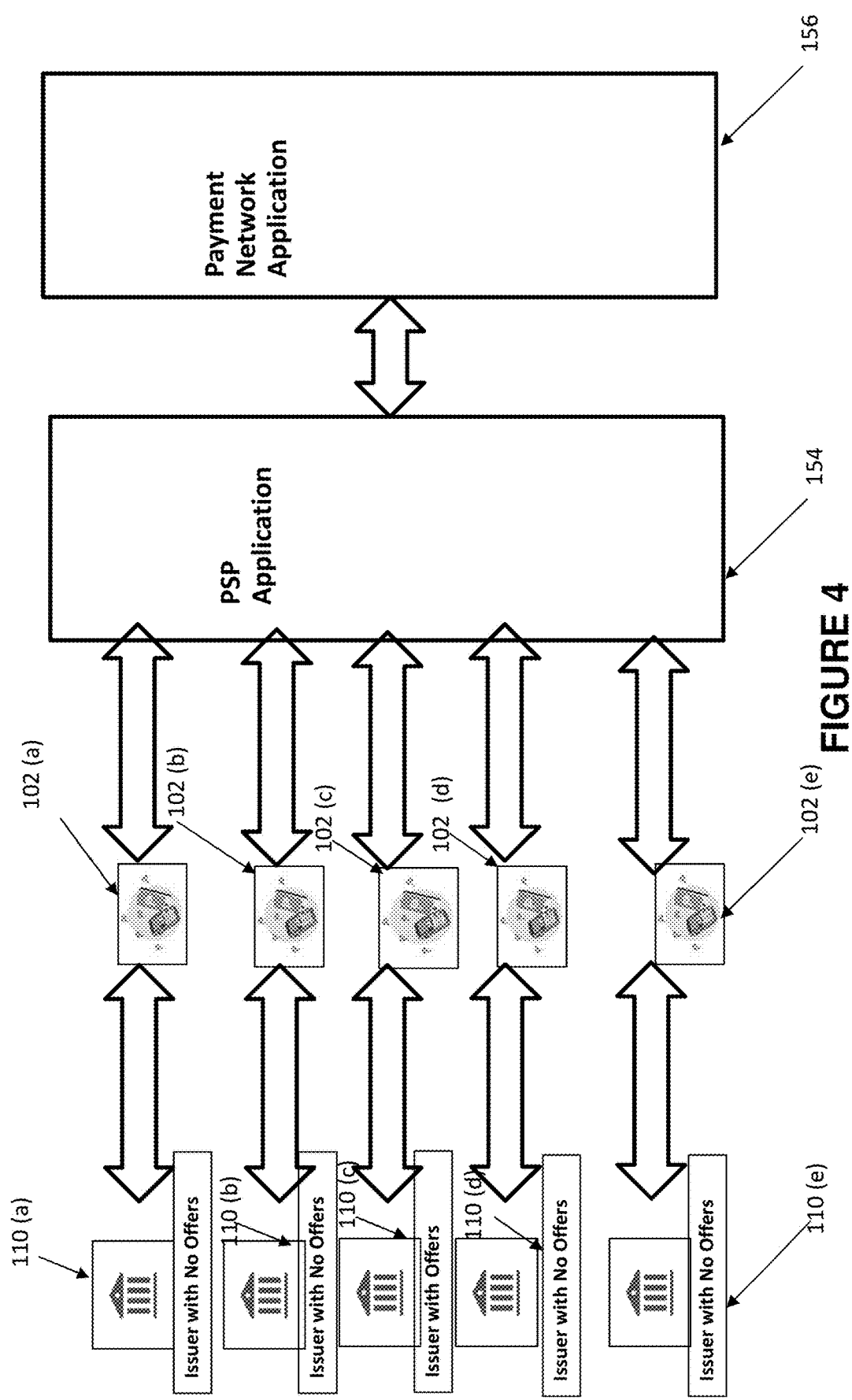
FIG. 4 shows how a PSP application typically manages promotion messages from one or more issuers.

FIG. 4 shows how PSP applications typically manage promotion messages from one or more issuers according to various embodiments. For example, one or more PSP applications 156 executing on one or more PSP devices 102(a)-(e) may each receive a transaction request message indicating a corresponding issuer 110(a)-(e). In order to determine if the one or more issuers 110(a)-(e) is currently offering a promotion, the PSP applications 156 may retrieve information from a database 109 (e.g., an offline check). In the event that the PSP applications 156 determines that the issuer indicated in the transaction request message is one who is offering a promotion, it will forward the transaction request message to a payment network application 154.

Figure 5:
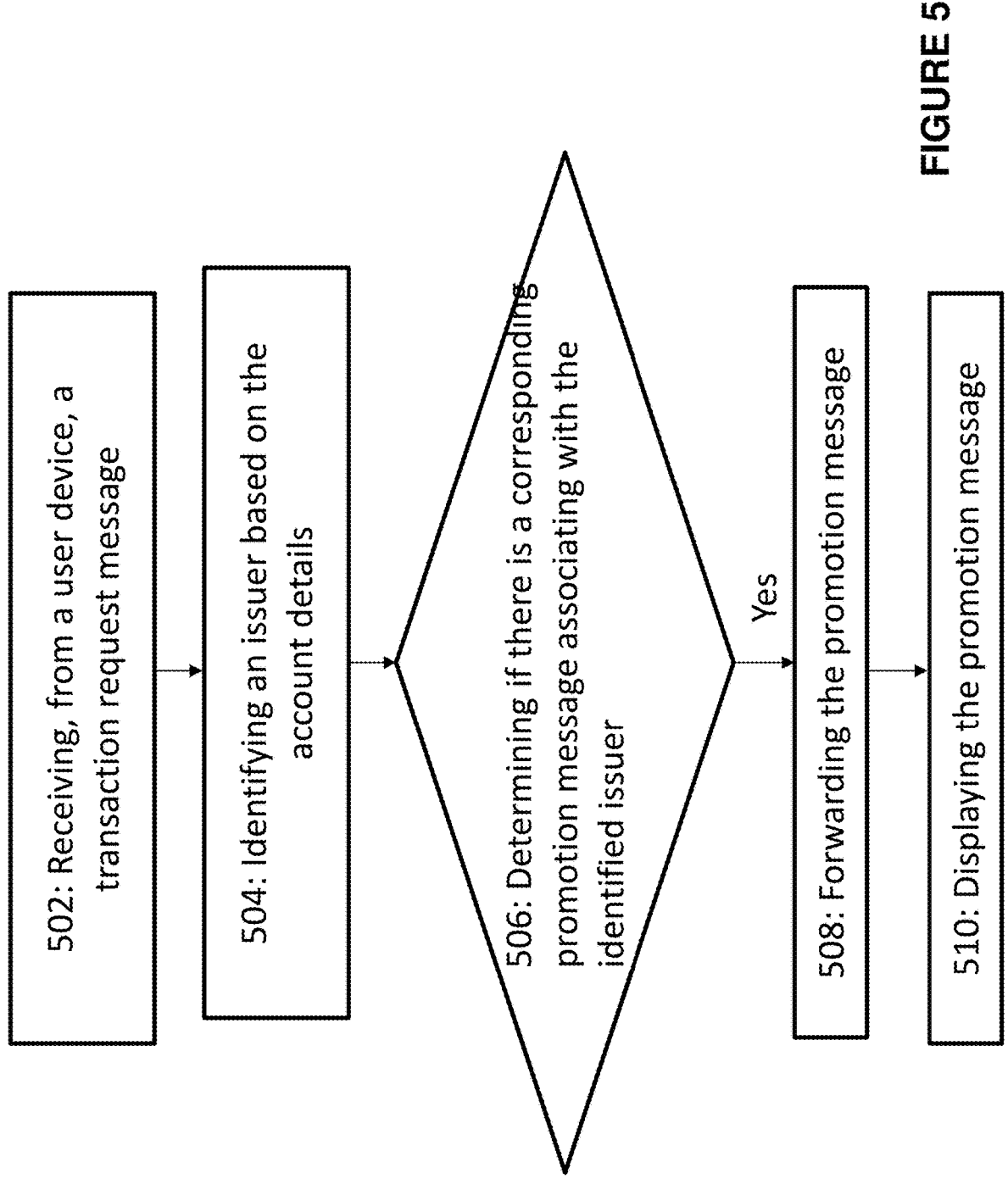
FIG. 5 shows how a flow chart illustrating how a PSP application may be used to adaptively manage promotions from one or more issuers.

FIG. 5 shows how a PSP application 156 may be used to adaptively manage promotions from one or more issuers according to various embodiments. At 502, the PSP application 156, executing on a PSP device, receives a transaction request message. The transaction request message includes account details.

At 504, the PSP application 156 identifies an issuer based on the account details indicated in the transaction request message. The PSP application 156 may display the identified issuer to the user.

At 506, the PSP application 156 determines if there is a corresponding promotion message associating with the identified issuer.

At 508, the PSP application 156 receives the promotion message associating with the identified issuer to the user.

At 510, the PSP application 156 displays the corresponding promotion message associated with the identified issuer.

Figure 6:
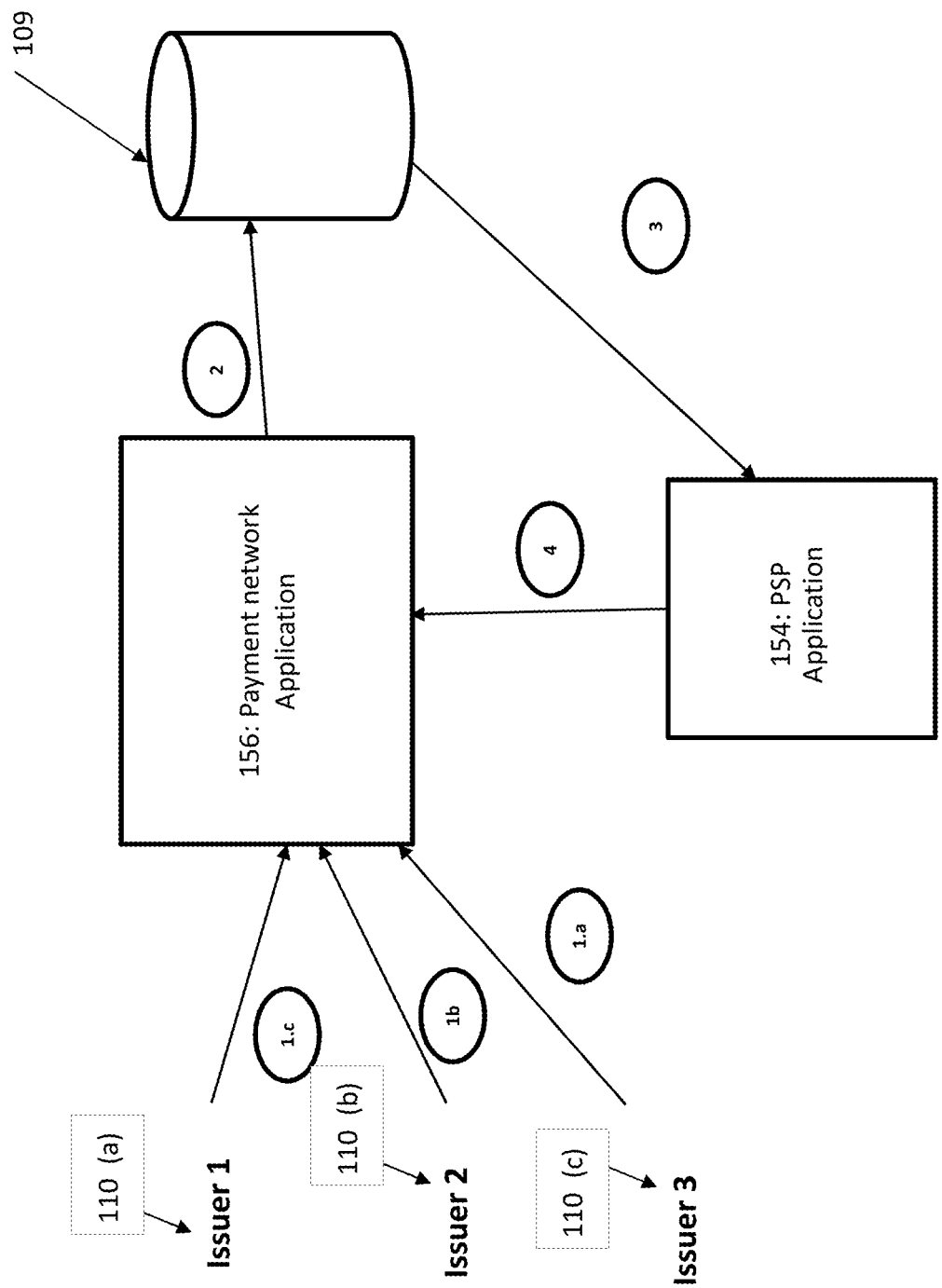
FIG. 6 shows how a PSP application gets real-time updates when one or more issuers offer a promotion.

FIG. 6 shows how a PSP application 156 gets real-time updates when one or more issuers 110(a)-(c) offer a promotion. When any one of the issuers 110(a)-(c) offers a promotion, it will send a promotion message 1a-1c to a payment network application 154. Before a further promotion message 1a-1c is received at the payment network application 154 from another one of the issuer servers 110(a)-(c), the payment network application 154 updates a database (or a PSP database 109) with an update message 2, in response to receiving a promotion message 1a-1c before receiving a further promotion message. In the event that the payment network application 154 receives a further promotion message while it is still updating the database with the update message 2, it may be instructed by the payment network server 108 to hold the further promotion message. Alternatively, the payment network server 108 may instruct the payment network application 154 not to receive a further promotion message until the updated message relating to the promotion message has been updated.

In response to receiving an update message 2, the payment network server 108 may initiate a service call 3 to a payment network application 154, indicating that an update has been made to the database 109. Additionally, the payment network application 154 may send an acknowledgment message 4 to the database 109, in response to receiving the service call 3. These steps ensure that the payment network application 154 has an updated promotion message from one or more issuers.

Figure 7:
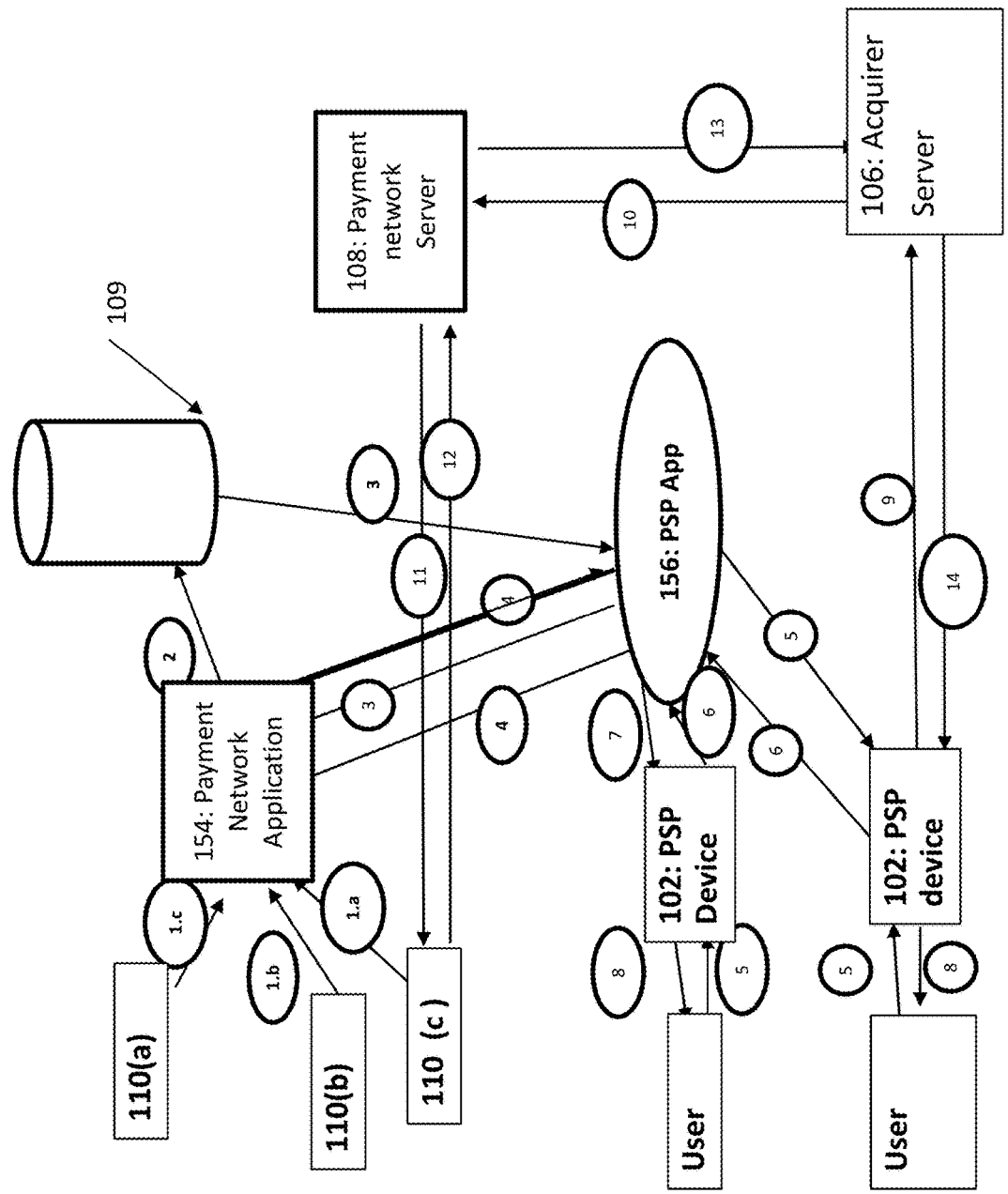
FIG. 7 shows how a system adaptively manages one or more messages from one or more issuers in a real-time manner.

FIG. 7 shows how a system adaptively manages one or more messages from one or more issuers in a real-time manner. Messages 1(a)-(c), 2, 3, 4 may be analogue to messages 1(a)-(c), 2, 3, 4 described in FIG. 6. In the event that a user swipes a card (or taps a NFC-enabled mobile phone or a user device 101) at a PSP device 102 a transaction request message 5 is generated and is forwarded as a message 6 to a PSP application 156 which retrieve information from a database 109 to determine if an issuer indicated in the transaction message is offering a promotion. In other words, the PSP application 156 does an offline check and filters the transaction request messages. The filtered transaction request messages 6a are forwarded to a payment network application 154. The payment network application 154 performs an eligibility check and sends an eligibility response 6b over to the PSP application 156. The PSP application 156 responds to the PSP device 102 with an approval or denial response 8. In the event that an approval response 8 is sent to the customer, the user can choose from the offers and complete the purchase. Messages 9, 10, 11 are AUTH (or payment authorization request) request messages (e.g., 0100 messages) and messages 12, 13, 14 are AUTH (or payment authorization response) response messages (e.g., 0110 messages). In various embodiments, the response from a PSP application 156 is faster than BAU (or Business As Usual) Auth response.

Figure 8:
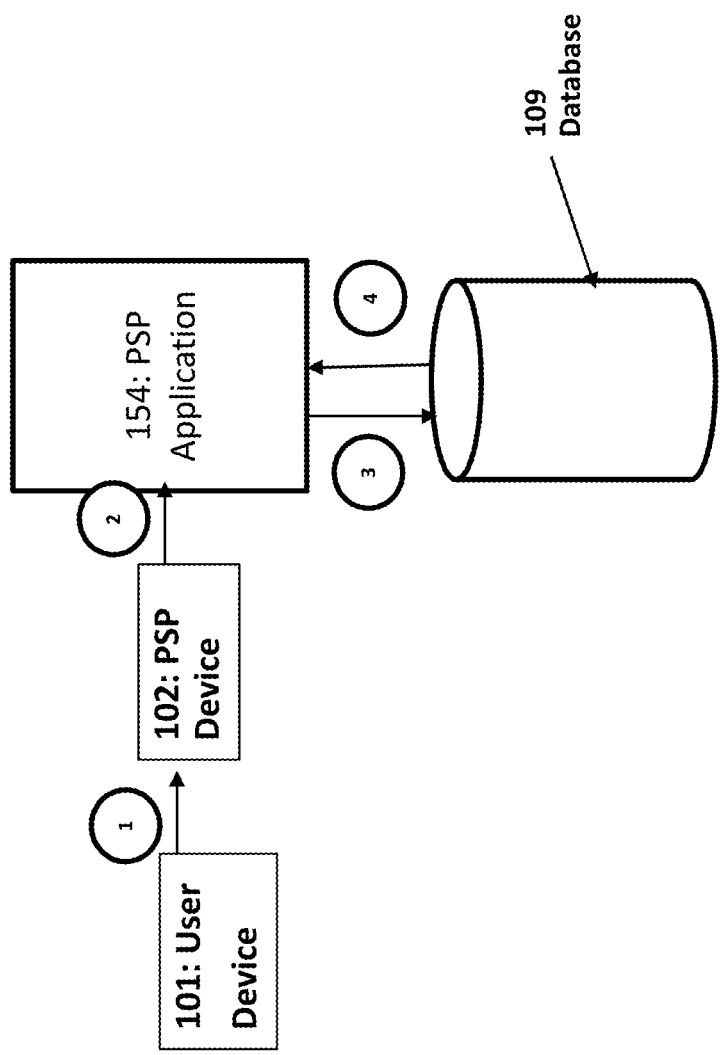
FIG. 8 shows how a conventional PSP device may be configured to implement various embodiments.

FIG. 8 shows how a PSP device 102 may be configured to implement various embodiments. Advantageously, various embodiments may be implemented on existing PSP devices without having to be replaced with new ones. For example, the PSP device 102 may be updated to execute the following algorithm:

```
Extract ICA/Member ID and PAN in local variables from the card swipe.
Search Replicated data with Member ID as key.
If Member ID found
    look for PAN being in any of the ranges defined for the ID
    IF PAN in range then SEARCH for Offer
    If Offer found then SET OFFER Found as TRUE
End-If
IF OFFER TRUE
    proceed to create API request for MC servers.
ELSE
    KILL Request
End-IF
```

With the algorithm above, the PSP device 102 may extract a user identifier and PAN in response to a swiping of a card, as shown in information flow 1. The PSP device 102 may search replicated data based on the user identifier. In the event that that the account identifier is found, the PSP device 102 may then determine if the PAN belongs to a range in which an offer is being offered, by retrieving the necessary information, via the PSP database 109, as shown in information flows 2, 3 and 4.

Figure 11A:
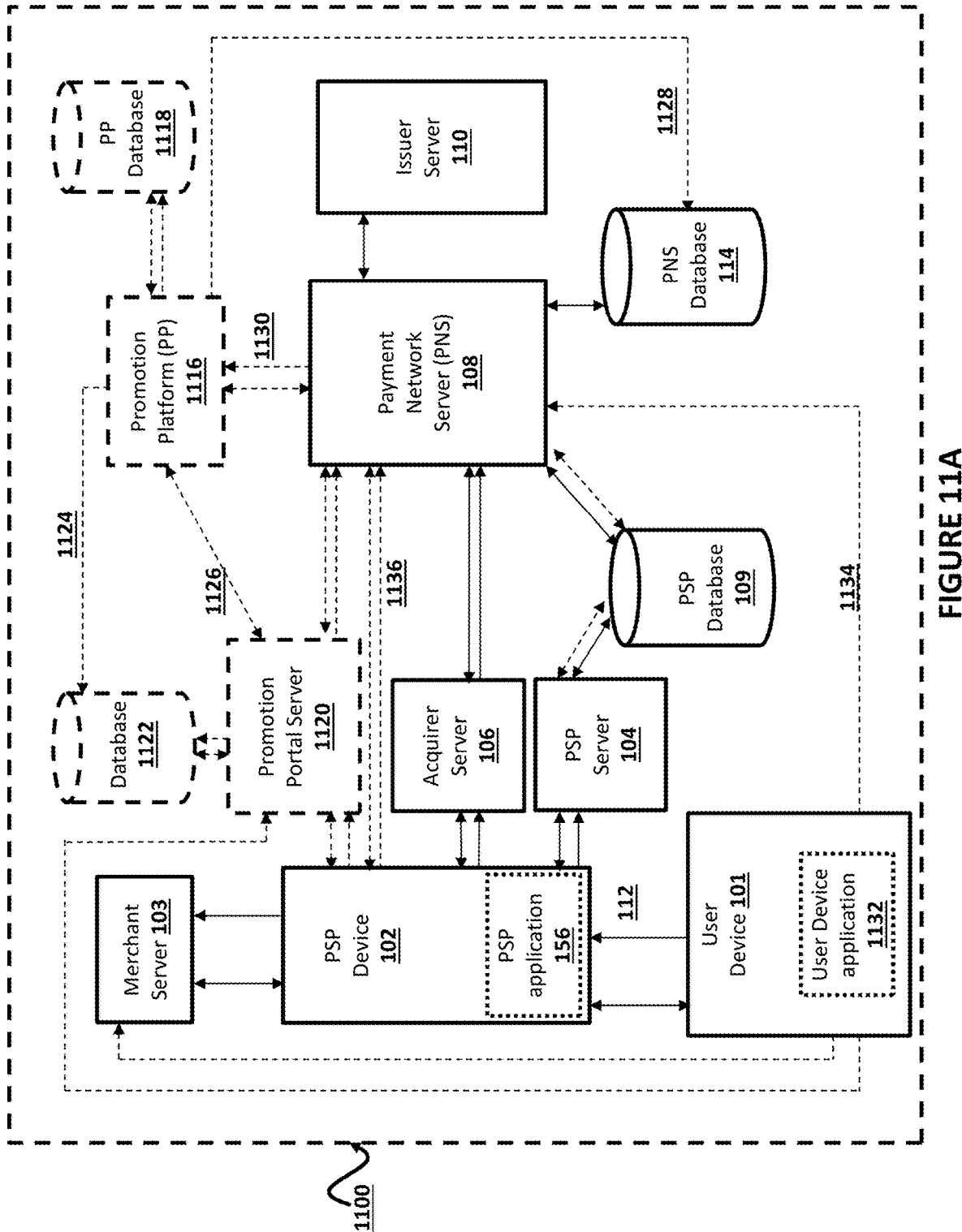
FIGS. 11A and 11B show a block diagram of a transaction system within which account information and issuer information can be received.

FIG. 11A illustrates a block diagram of a transaction system 1100 within which transaction data can be received.

The system 1100, similar to system 100, comprises a user device 101, a PSP device 102, which has a PSP application 156 installed onto it, a merchant server 103, a PSP server 104, a PSP database 109, an acquirer server 106, a payment network server 108, a payment network server database 114 and an issuer server 110. These devices and servers are analogous to those listed in FIG. 1A. For example, in FIG. 11A, the user device 101 is in communication with the PSP device 102 in communication with a PSP server 104 as in FIG. 1A for the purposes of managing the transaction requests in FIG. 11A. Additionally or alternatively, the user device 101 includes a user device application 1132 installed onto it.

Additionally, the system 1100 comprises a promotion portal server 1120 in communication with the user device 101, the PSP device 102, the promotion platform 1116 and the payment network server 108. The promotion portal server 1120 may be configured to communicate with, or may include, a database 1122. The database 1122 stores data 1124 corresponding to account information that may be retrievable by the promotion portal server 1120. Examples of the data include information relating to an account eligible for a promotion transaction and a set of promotion eligibility criteria, e.g., a range of Primary Account Numbers (PANs) representing accounts that are eligible or a transaction amount threshold of an account or a global exclusion list. The database 1122 is configured to receive and store, from the promotion platform 1116, data corresponding to information relating to accounts eligible for a promotion transaction and a set of promotion eligibility criteria. The promotion platform is configured to update the database 1122 in a real-time manner, or whenever the promotion platform receives information that an account is eligible for a promotion or receives any updates on the promotion eligibility criteria. The promotion platform 1116 may be configured to communicate with, or may include, a promotion platform database 1118. The promotion platform database 1118 stores data corresponding to account information that may be retrievable by the promotion platform 1116.

The promotion portal server 1120 typically is associated with the payment network server 108 which is associated with the payment facilitator. In an embodiment, the promotion portal server 1120 may be an XML Gateway. Alternatively, the promotion portal server 1120 may be the payment network server 108. The XML Gateway typically manages (receives, filters or forwards) all transactions from PSPs. For the purposes of determining if an account in a transaction request is eligible for a promotion transaction, the promotion portal server 1120 (XML Gateway) communicates with the user device 101 or PSP device 102 directly to receive a promotion Application Programming Interface (API) call comprising information related to the account in a transaction request, which then compares the account information indicated in the transaction request with the one or more account information stored in the database 1122 so as to determine if the account information indicated in the transaction request is eligible for the promotion. The promotion API call is established through a connectivity between the user device 101 or PSP device 102 and the promotion portal server 1120 (XML Gateway). This gives rise to the advantage of faster customer and PSP integration as all they have to do is establish connectivity and make API calls.

In an example, the PAN of an account indicated in a transaction request falls in the range of PANs representing accounts that are eligible and the transaction amount of the requested transaction is within the transaction amount threshold of the account. In this case, the promotion portal server 1120 (XML Gateway) forwards the transaction request 1126 to the promotion platform 1116 and subsequently receives, from the promotion platform 1116, a promotion option wherein the promotion option presents a choice to participate in the promotion. The promotion portal server 1120 (XML Gateway) then proceeds to send a promotion option message to the PSP device 102, presenting the promotion option with details of promotions, such as promotion plans (e.g., an interest-free installment over six months plan or an interest-free installment over eight months plan) to the user via the PSP device 102 or the user device 101. Upon being presented with the promotion option, the user may choose whether or not to participate in the promotion. Additionally, the user may choose which promotion plan they want to participate in if they choose to participate in the promotion. The user reply may then be received and the transaction request is forwarded to the issuer to complete the transaction with the promotion if the user chooses to participate in the promotion. If the user chooses not to participate in the promotion, the transaction request will be forwarded to the issuer to complete the transaction without the promotion.

If, on the contrary, the PAN of an account indicated in a transaction request falls out of the range of PANs representing accounts that are eligible and/or the transaction amount of the requested transaction exceeds the transaction amount threshold of the account, the promotion portal server 1120 (XML Gateway) will not forward the transaction request to the promotion platform; it will instead, forward the transaction request to an issuer indicated in the account information to complete the transaction without the promotion.

In an embodiment, when the promotion portal server 1120 is the payment network server 108, the user device 101 and PSP device 102 may be in communication with the payment network server 108 directly. The payment network server 108 may be configured to communicate with, or may include, a payment network server database 114. The payment network server database 114 stores data 1128 corresponding to account information that may be retrievable by the payment network server 108. The payment network server 108 typically operates to process transactions and to clear and settle funds for payments between two entities. For the purposes of determining if an account in a transaction request is eligible for a promotion transaction, the payment network server 108 communicates with the user device 101, or PSP device 102, directly to receive a promotion Application Programming Interface (API) call comprising account information, 1134 and 1136 respectively, related to the account in a transaction request, which then compares the account information indicated in the transaction request with the one or more account information stored in the payment network server database 114 so as to determine if the account information indicated in the transaction request is eligible for the promotion. The promotion API call is established through a connectivity between the user device 101, or PSP device 102, and the promotion portal server 1120 (payment network server 108). This gives rise to the advantage of faster customer and PSP integration as all they have to do is establish connectivity and make API calls.

In an example, the PAN of an account indicated in a transaction request falls in the range of PANs representing accounts that are eligible and the transaction amount of the requested transaction is within the transaction amount threshold of the account. In this case, the payment network server 108 forwards the transaction request 1130 to the promotion platform 1116 and subsequently receives, from the promotion platform 1116, a promotion option wherein the promotion option presents a choice to participate in the promotion. The payment network server 108 then proceeds to send a promotion option message to the PSP device 102, presenting the promotion option with details of the promotion, such as promotion plans (e.g., an interest-free installment over six months plan or an interest-free installment over eight months plan) to the user via the PSP device 102 or the user device 101. Upon being presented with the promotion option, the user may choose whether or not to participate in the promotion. Additionally, the user may choose which promotion plan they want to participate in if they choose to participate in the promotion. The user reply may then be received and the transaction request is forwarded to the issuer to complete the transaction with the promotion if the user chooses to participate in the promotion. If the user chooses not to participate in the promotion, the transaction request will be forwarded to the issuer to complete the transaction without the promotion.

If, on the contrary, the PAN of an account indicated in a transaction request falls out of the range of PANs representing accounts that are eligible and/or the transaction amount of the requested transaction exceeds the transaction amount threshold of the account, the payment network server 108 will not forward the transaction request to the promotion platform; it will instead, forward the transaction request to an issuer indicated in the account information to complete the transaction without the promotion.

Figure 11B:
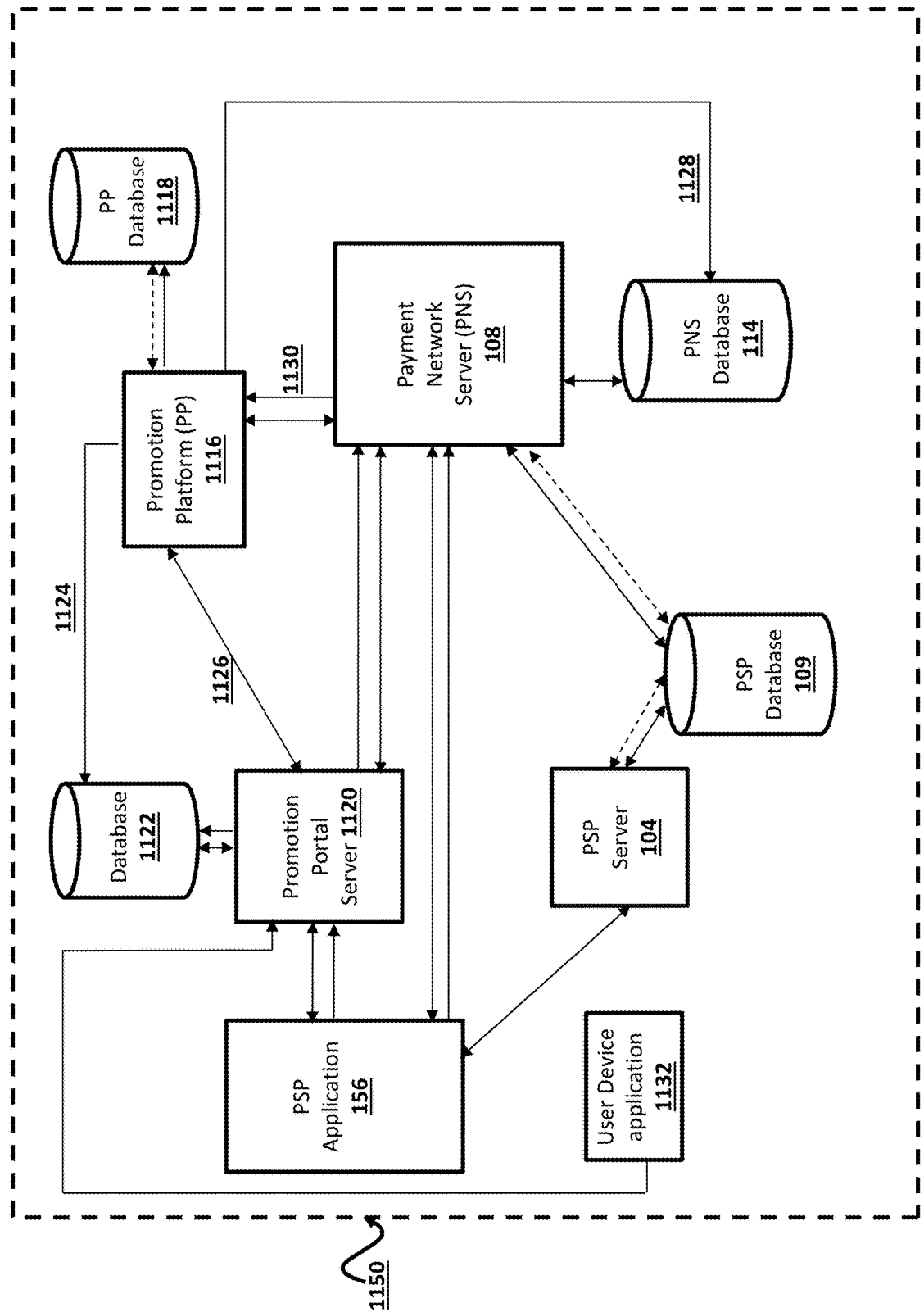

FIG. 11B shows a diagram 1150 having a payment network server 108 for processing a transaction request using a promotion portal server 1120 that is configured to communicate with a user device application 1132 or a PSP application 156. The promotion portal server 1120 includes a processor configured to retrieve account information of accounts which are eligible for promotion transactions or promotion criteria for verification from the database 1122, which is updated by the promotion platform 1116 periodically on the account information of accounts which are eligible for promotion transactions and promotion criteria. Advantageously, this enables the promotion portal server 1120 to filter ineligible promotion transaction requests by comparing the PAN information in the transaction request with the range of PAN information in the database amongst other predetermined criteria before forwarding only the eligible transactions to the promotion platform 1116 thereby reducing the volume of unnecessary traffic on the promotion platform.

The predetermined criteria refers to conditions determined by at least one entity (e.g., an issuer) under which an account may be used for a promotion. The determination may be performed in response to a credibility score, reliability score or confidence score relating to the account based on historical transaction data. Additionally or alternatively, the determination may also be performed based on the type of the account, e.g., whether it corresponds to one having a specific net worth (e.g., a saving account having an amount higher than a predetermined amount).

In response to the determination by promotion portal server 1120 if the account indicated in the transaction request is permitted to participate in the promotion, the promotion portal server 1120 may forward the transaction request 1126 to the promotion platform 1116 and subsequently receive, from the promotion platform 1116, a promotion option wherein the promotion option presents a choice to participate in the promotion, when it is determined that the account indicated in the transaction request is permitted to participate in the promotion. Alternatively, the promotion portal server 1120 will not forward the transaction request to the promotion platform; it will instead, forward the transaction request to an issuer indicated in the account information to complete the transaction without the promotion when it is determined that the account indicated in the request is not eligible to participate in the promotion.

Such a promotion portal server 1120 may be used to implement the method 1200 shown in FIG. 12. FIG. 12 shows a flowchart illustrating a method 1200 for determining if an account in a transaction request is eligible for a promotion according to embodiments of the disclosure.

The method 1200 may be performed by one or more purpose-built computing devices, such as the promotion portal server 1120 that may be coupled to one or more databases. In one embodiment, it may be an XML Gateway while in another embodiment, it may be the payment network server.

At step 1202, a transaction request corresponding to a user is received from the PSP device with the transaction request indicating an account information of an account. In an embodiment, the transaction request may be initiated by the user through the PSP device at the point of sale at a premise of a payee (or merchant) upon the user indicating an interest to make a purchase. Additionally or alternatively, the transaction request may be received from the user device 101.

At step 1204, it is determined if the account information indicated in the promotion transaction request is eligible for the promotion by comparing the account information indicated in the transaction request with one or more account information stored in a database. In an embodiment, the account information indicated in the transaction may include a range of Primary Account Numbers (PANs) representing accounts that are eligible or promotion criteria, such as transaction amount threshold of an account or a global exclusion list. The one or more account information, such as PANs of accounts which are eligible for promotion transactions and promotion criteria stored in the database 1122, may be updated periodically by the promotion platform 1116. In an example, the eligible accounts may differ periodically based on subscription of the users and the promotion criteria may also be updated to include any new exclusions from the users based on their credibility score.

At step 1206, the transaction request is forwarded to the promotion platform in response to determining if the account information indicated in the transaction request is eligible for the promotion. In an embodiment, step 1206 is performed if it is determined that the account information indicated in the transaction request is eligible for the promotion. For example, if the PAN of an account indicated in a transaction request falls in the range of PANs representing accounts that are eligible and the transaction amount of the requested transaction is within the transaction amount threshold of the account. The promotion portal server 1120 forwards the transaction request 1126 to the promotion platform 1116.

At step 1208, further to step 1206, a promotion option is received from the promotion platform if the account information indicated in the transaction request is eligible for the promotion. The promotion option presents a choice to participate in the promotion. In various embodiments, the promotion option includes details relating to the promotion. Additionally, the promotion option includes details of two or more promotions that are facilitated by one issuer. For example, one promotion may relate to an interest-free installment over a six months plan, while another plan may relate to an interest-free installment over an eight months plan.

At step 1210, further to step 1208, a promotion option message is sent to the user device 101, or the PSP device 102, to notify the user of the promotion option representing a choice to participate in the promotion. Additionally, the promotion option may present a choice to participate in one of the two or more promotions.

Alternatively, if it is determined that the account information indicated in the transaction request is not eligible for the promotion, step 1212 is performed. The transaction request may be forwarded to an issuer indicated in the account information to complete the transaction without the promotion.

Subsequent to step 1210, at step 1216, a user reply may be received from the PSP device 102, or the user device 101, in response to the receipt of the promotion option message.

At step 1218, it is determined if the user reply indicates an interest to participate in the promotion so as to determine if the transaction should be completed with or without the promotion.

At step 1220, the transaction request is forwarded to the issuer indicated in the account information if it is determined that the user reply indicates an interest to participate in the promotion. The user reply may indicate an interest to participate in one of two or more promotions.

Alternatively, if it is determined that the user reply does not indicate an interest to participate in the promotion, step 1222 is performed. The transaction request may be forwarded to an issuer indicated in the account information to complete the transaction without the promotion.

Figure 13:
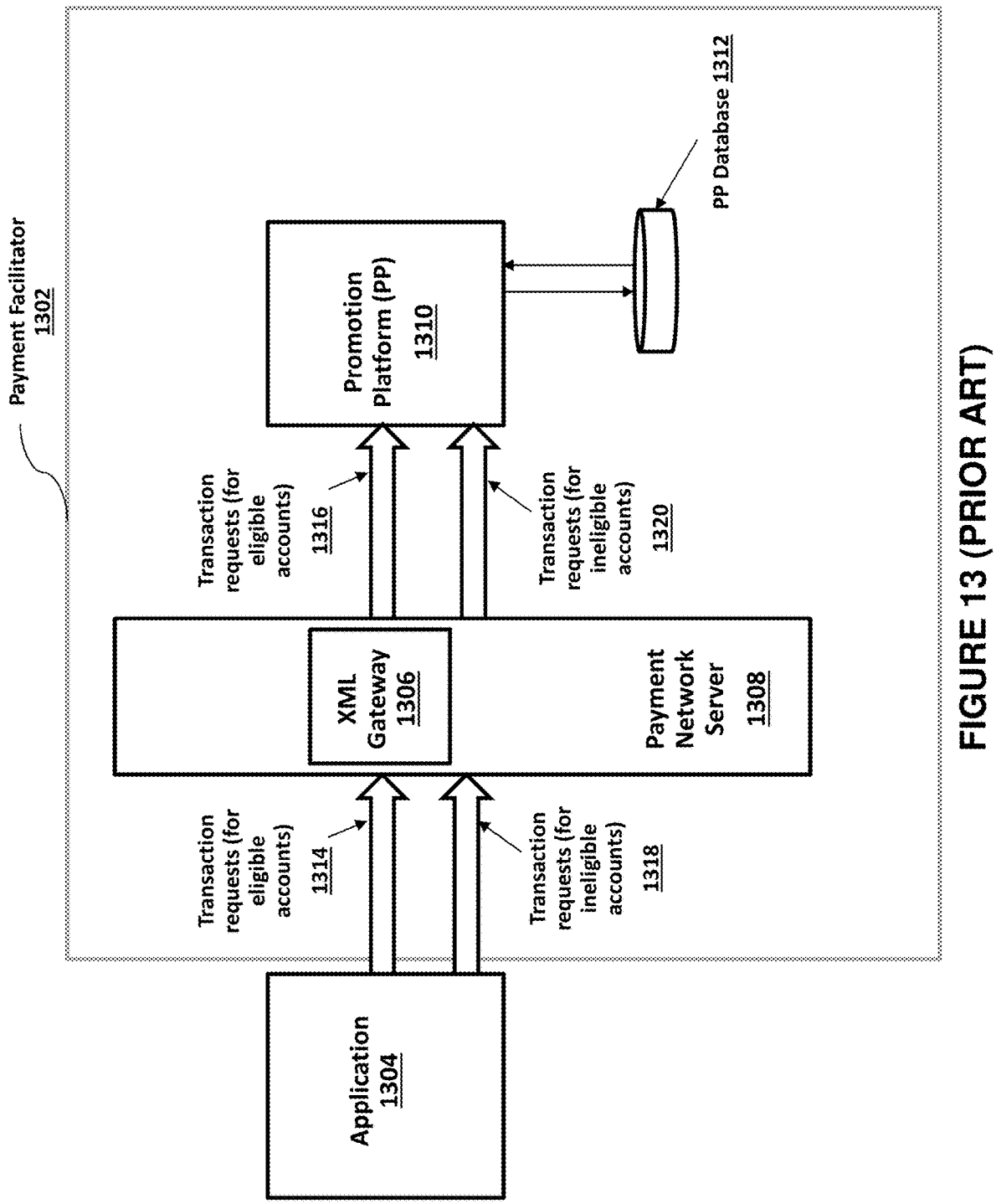
FIG. 13 (PRIOR ART) shows how a conventional XML Gateway or a conventional payment network server typically manages transaction requests from an application.

FIG. 13 shows how a conventional XML Gateway 1306 or a conventional payment network server 1308 typically manages transaction requests 1314 or 1318 from an application 1304. In various embodiments, the application 1304 may be the PSP application 156 or the user device application 1132. For example, upon the initiation of a transaction requests by the users via the PSP application 156. or the user device application 1132, the application may forward the account information of the transaction requests including transaction requests for eligible accounts 1314 and that of transaction requests for ineligible accounts 1318 to the promotion platform 1310 via the XML Gateway 1306, or payment network server 1308, to determine if the one or more accounts are eligible for a promotion. The XML Gateway 1306 may be one that is part of the payment network server 1308. In other words, the transaction requests for eligible accounts 1316 and the transaction requests for ineligible accounts 1320 are forwarded to the promotion platform 1310 without performing any eligibility checks at the XML Gateway 1306 and the payment network server 1308 to determine if the transaction requests are those that are eligible for promotions. The promotion platform 1310 may retrieve information from the promotion platform database 1312 to determine if the account information indicated in the transaction requests are eligible for the promotion before further processing to complete the transaction. It is to be appreciated that the XML Gateway 1306, payment network server 1308 and promotion platform 1310 are managed by the payment facilitator 1302.

Figure 14:
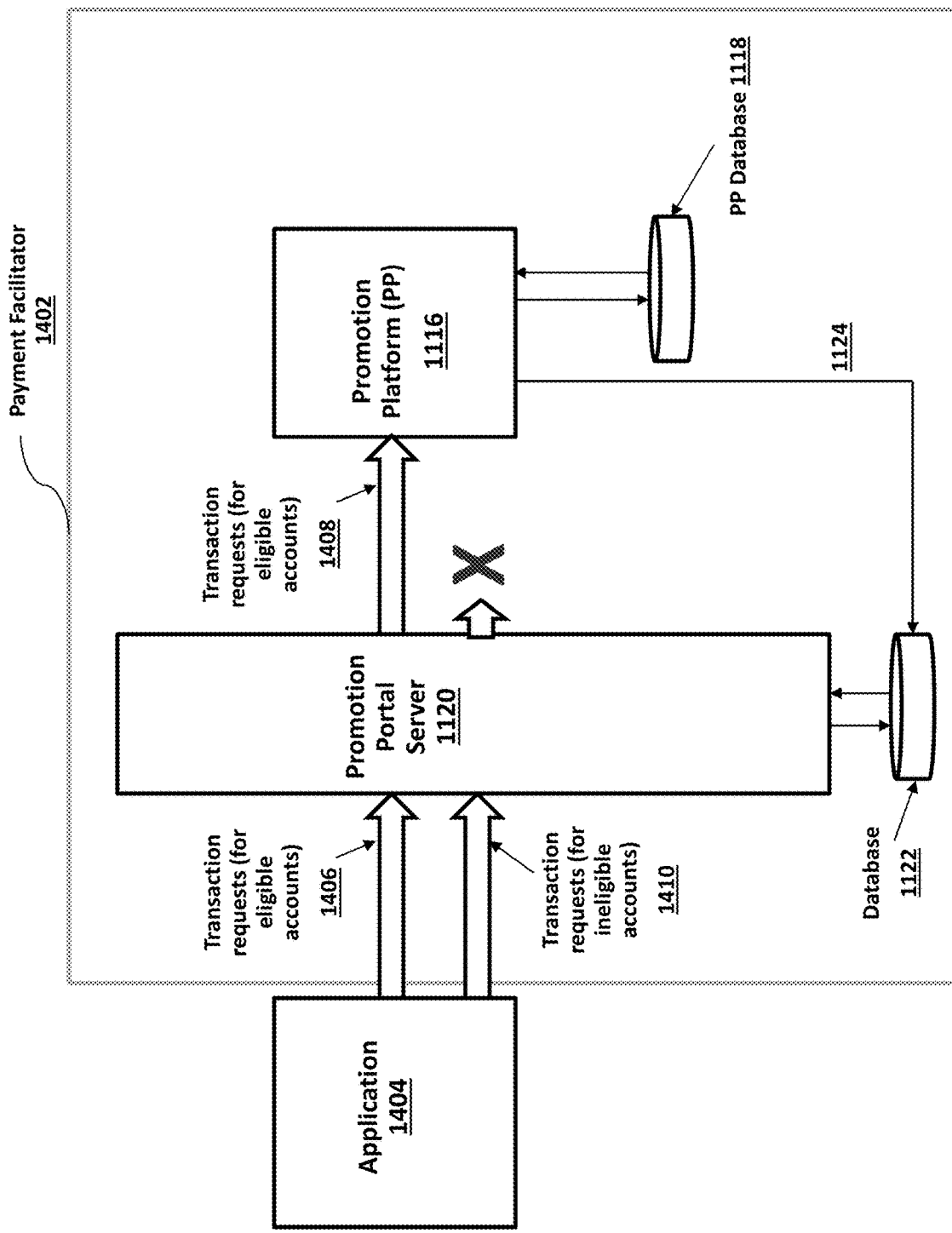
FIG. 14 shows how a promotion portal server (such as an XML Gateway or a payment network server) typically manages transaction requests from an application.

FIG. 14 shows how a promotion portal server 1120 (such as an XML Gateway or a payment network server) is incorporated into the system to manage transaction requests 1406 or 1410 from an application 1404. In various embodiments, the application 1404 may be the PSP application 156 or the user device application 1132. For example, upon the initiation of transaction requests by the users via the PSP application 156 or the user device application 1132, the application may forward the account information of transaction requests including transaction requests for eligible accounts 1406 and that of transaction requests for ineligible accounts 1410 and then forward the account information to the promotion portal server 1120. In order to determine if the one or more accounts are eligible for a promotion, the promotion portal server 1120 may retrieve information from a database 1122 (e.g., an offline check). It is to be appreciated that the database may be the payment network server database 114 if the promotion portal server 1120 is the payment network server. In the event that the promotion portal server 1120 determines that the account indicated in the transaction request is one which is eligible for a promotion, it will forward the transaction request (for eligible accounts) 1408 to the promotion platform 1116 for further processing to complete the transaction. If it is determined that the account indicated in the transaction request is one which is ineligible for the promotion, the transaction request will not be forwarded to the promotion platform; instead it will be forwarded to an issuer indicated in the account information to complete the transaction without the promotion. It is to be appreciated that this advantageously filters the ineligible accounts from being forwarded to the promotion platform 1116 thereby reducing the volume of unnecessary traffic on the promotion platform 1116. The database 1122 is updated by the promotion platform 1116 periodically on data 1124, such as the account information of accounts which are eligible for promotion transactions and promotion criteria. It is to be appreciated that the promotion portal server 1120 and promotion platform 1116 are managed by the payment facilitator 1402.

Figure 15:
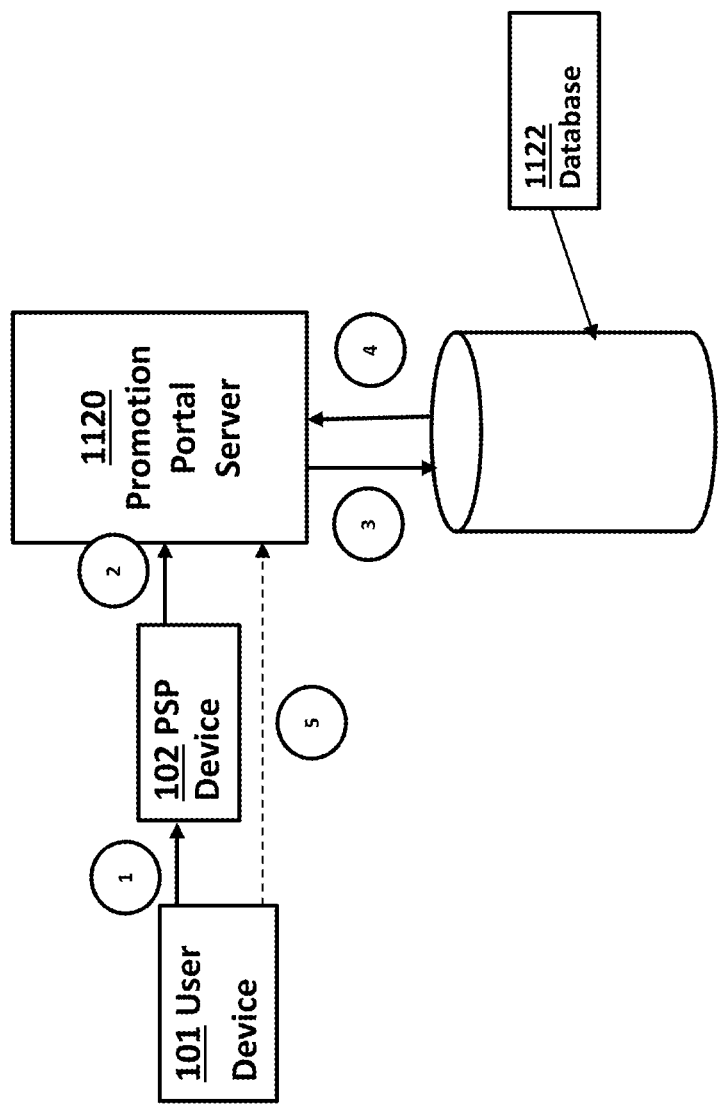
FIG. 15 shows how a conventional server may be configured to implement various embodiments.

FIG. 15 shows how a promotion portal server 1120 may be configured to implement various embodiments. Advantageously, various embodiments may be implemented on existing infrastructures, such as the XML Gateway or the payment network server, without having to be replaced with new ones. For example, the XML Gateway or the payment network server may be updated to execute the following algorithm:

Extract ICA/Member ID and PAN in local variables from the card swipe or from the card details input by a user through a user device when a promotion transaction is requested.

Search Replicated data with Member ID as key.
If Member ID found
   look for PAN being in any of the ranges defined for the ID
   IF PAN in range then SEARCH for ELIGIBILITY
   If ELIGIBILITY found then SET ELIGIBILITY Found as TRUE
End-If
IF ELIGIBILITY TRUE
   proceed to create API request for MC servers.
ELSE
   KILL Request
End-IF With the algorithm above, the PSP device 102 may extract a user identifier and PAN in response to a user requesting a transaction and swiping a card at a POS, as shown in information flow 1, and forward the user identifier and PAN to the promotion portal server 1120, as shown in information flow 2. Alternatively, the promotion portal server 1120 may extract a user identifier and PAN in response to a user requesting a transaction and providing card details through a user device 101, as shown in information flow 5. The promotion portal server 1120 may search replicated data based on the extracted user identifier. In the event that that the user identifier is found, the promotion portal server 1120 may then determine if the PAN belongs to a range in which the account is eligible for the promotion and determine if any other promotion criteria is satisfied, by retrieving the necessary information, via the database 1122, as shown in information flows 3 and 4. It is to be appreciated that the database may be the payment network server database 114 if the promotion portal server 1120 is the payment network server.

Figure 17:
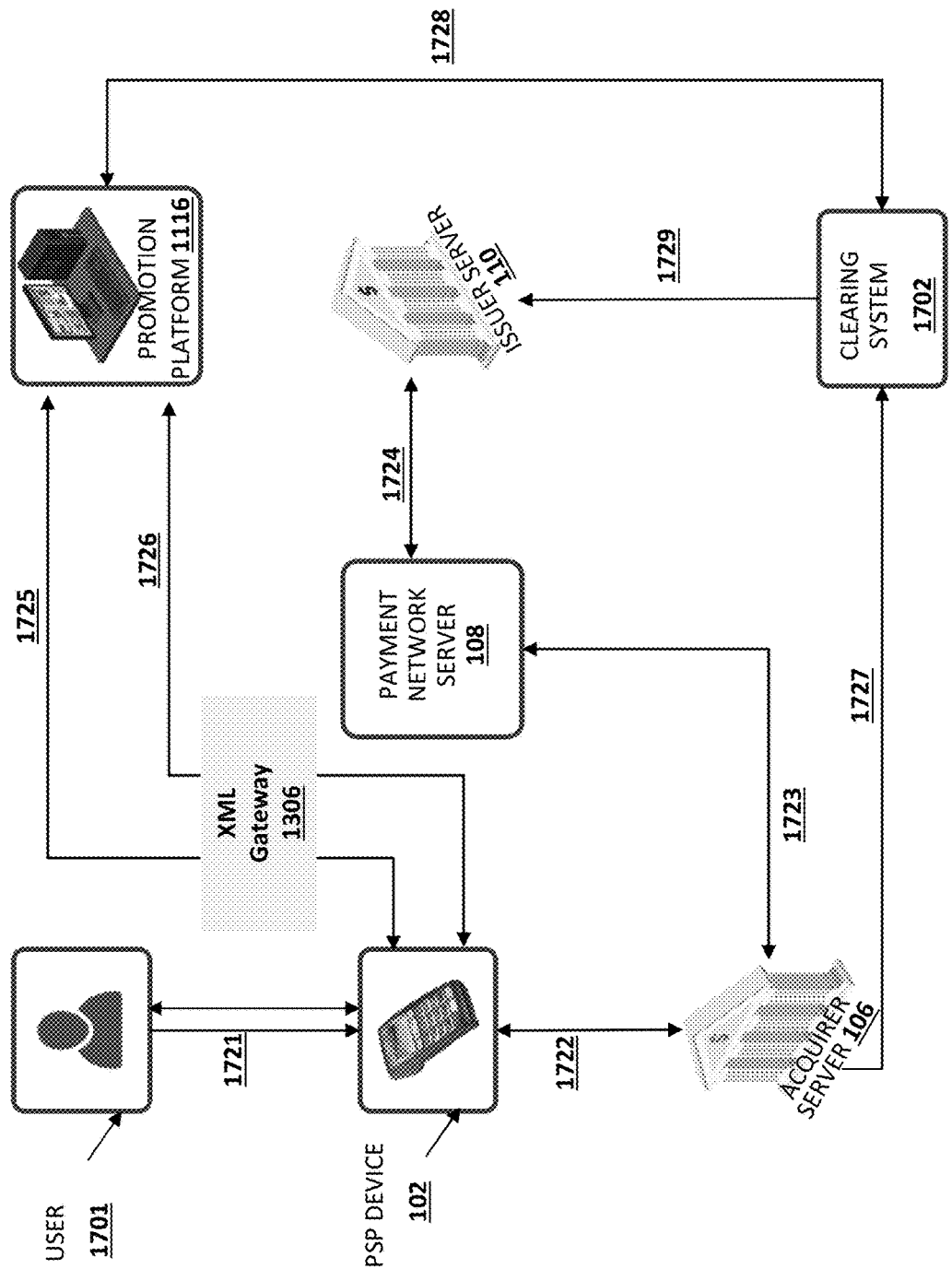
FIG. 17 shows an example of a transaction flow in a promotion portal server, such as an XML Gateway.

FIG. 17 shows an example of a transaction flow in a promotion portal server 1120, such as an XML Gateway. Take for example, when a transaction request 1721 is initiated and input by the user 1701 to the PSP device 102, the usual authorization request and response 1722 between the PSP device 102 and the acquirer server 106, the usual authorization request and response 1723 between the acquirer server 106 and the payment network server 108 and the usual authorization request and response 1724 between the payment network server 108 and the issuer server 110 are activated and processed. At the same time, upon receipt of the transaction request 1721, the PSP device 102 forwards the account information of the transaction request to the XML Gateway 1306. The XML Gateway 1306 then performs the operations described in FIG. 12 to determine if the account indicated in the transaction request is eligible for a promotion and forwards the transaction request 1725 to the promotion platform 1116 if it is determined that the account indicated in the transaction request is eligible for the promotion. The promotion platform then sends a promotion option and details of the promotion 1726 to be sent via the XML Gateway 1306 to the PSP device 102 to be presented to the user 1701 as an option before completion of the transaction. Subsequently, the usual clearing message 1727 will be sent from the acquirer server 106 to the clearing system 1702 and an enhanced clearing message with promotion data 1729 will be sent from the clearing system 1702 to the issuer server 110. The clearing of the promotion transaction request and response with details of promotion in 1726 is also performed at 1728.

FIG. 18 shows an example of a transaction flow in a promotion portal server 1120, such as a payment network server 108. Take for example, when a transaction request 1821 is initiated and input by the user 1801 to the PSP device 102, the usual authorization request and response 1822a between the PSP device 102 and the acquirer server 106, the usual authorization request and response 1824 between the acquirer server 106 and the payment network server 108 and the usual authorization request and response 1825a between the payment network server 108 and the issuer server 110 are activated and processed. Optionally, there may be a real-time approval 1825b sent from the issuer server 110 to the promotion platform 1116. At the same time, upon receipt of the transaction request 1821, the PSP device 102 forwards the account information of the transaction request 1822b to the payment network server 108. The payment network server 108 then performs the operations described in FIG. 12 to determine if the account indicated in the transaction request is eligible for a promotion and forwards the transaction request 1823 to the promotion platform 1116 if it is determined that the account indicated in the transaction request is eligible for the promotion. The promotion platform then sends a promotion option and details of the promotion 1830 (equivalent to 1827) to be sent via the payment network server 108 to the PSP device 102 to be presented to the user 1801 as a promotion option. At the PSP device 102 (at 1828), the terminal displays the promotion option and the user 1801 makes a choice. Subsequently, when the user 1801 inputs their reply indicating an interest to participate in the promotion, the PSP device 102 forwards the reply 1829 (equivalent to 1826) to the promotion platform 1116 via the payment network server 108 to complete the promotion transaction. Optionally, a notification 1831 may be sent to the issuer server 110 about the user's reply. It is to be appreciated that if the user does not choose to participate in the promotion, the transaction request 1825a will be forwarded to the issuer server 110 to complete the transaction without any promotion. Subsequently, the usual clearing message 1832 will be sent from the acquirer server 106 to the clearing system 1802 and an enhanced clearing message with promotion data 1834 will be sent from the clearing system 1802 to the issuer server 110. The clearing of the promotion transaction request and response with details of promotion is also performed at 1833.

Figure 9:
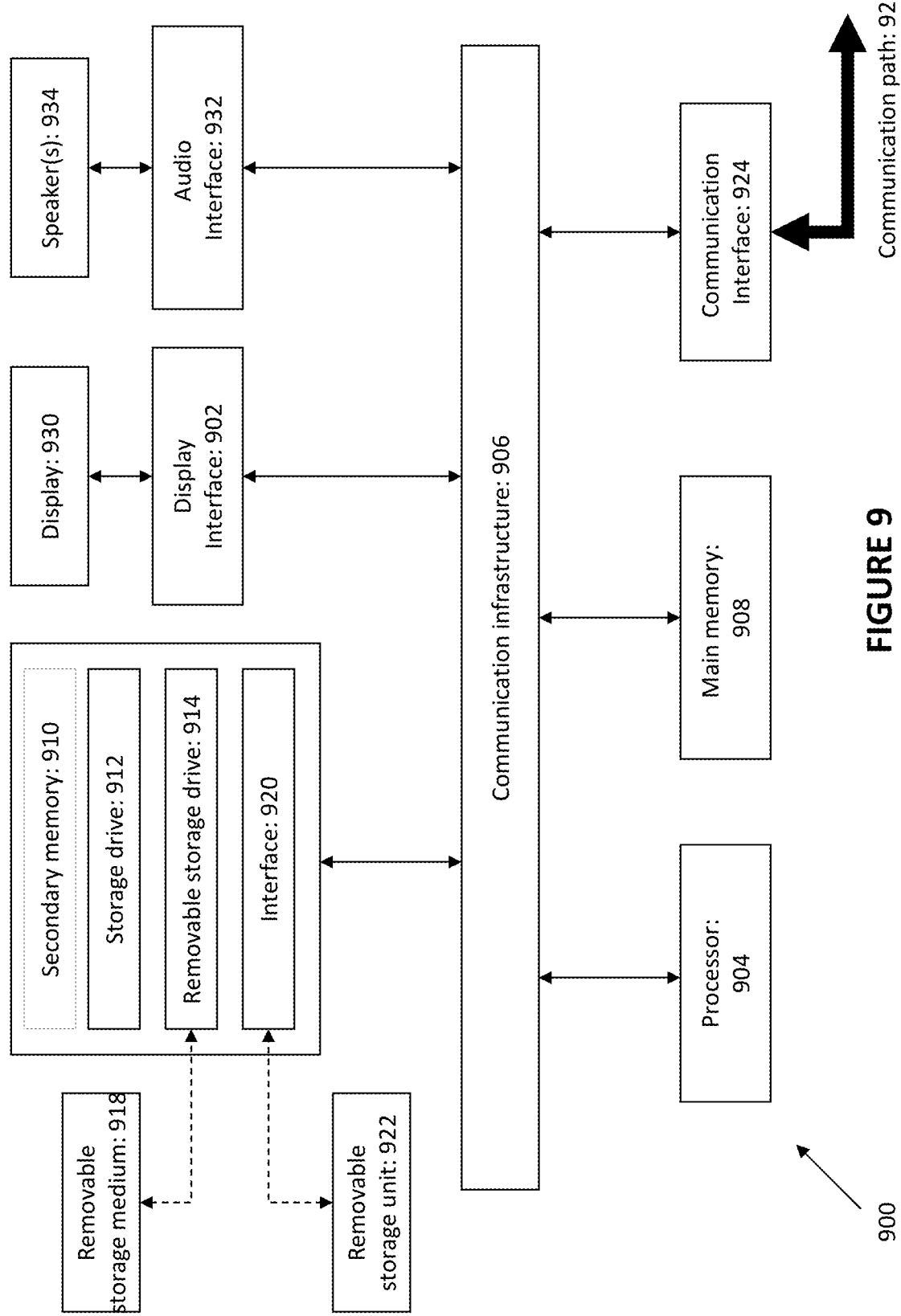
FIG. 9 shows a schematic diagram of a computer system suitable for use to implement the payment network server shown in FIGS. 1A, 1B, 11A and 11B.

FIG. 9 depicts an exemplary computer/computing device 900, hereinafter interchangeably referred to as a computer system 900, where one or more such computing devices 900 may be used to implement the payment network server 108 shown in FIGS. 1A, 1B, 11A and 11B. In addition, one or more components of the computer system 900 may be used to realize the computer system 900. The following description of the computing device 900 is provided by way of example only and is not intended to be limiting.

As shown in FIG. 9, the example computing device 900 includes a processor 904 for executing software routines. Although a single processor is shown for the sake of clarity, the computing device 900 may also include a multi-processor system. The processor 904 is connected to a communication infrastructure 906 for communication with other components of the computing device 900. The communication infrastructure 906 may include, for example, a communications bus, cross-bar, or network.

The computing device 900 further includes a main memory 908, such as a random access memory (RAM), and a secondary memory 910. The secondary memory 910 may include, for example, a storage drive 912, which may be a hard disk drive, a solid state drive or a hybrid drive and/or a removable storage drive 914, which may include a magnetic tape drive, an optical disk drive, a solid state storage drive (such as a USB flash drive, a flash memory device, a solid state drive or a memory card), or the like. The removable storage drive 914 reads from and/or writes to a removable storage medium 918 in a well-known manner. The removable storage medium 918 may include magnetic tape, optical disk, non-volatile memory storage medium, or the like, which is read by and written to by removable storage drive 914. As will be appreciated by persons skilled in the relevant art(s), the removable storage medium 918 includes a computer readable storage medium having stored therein computer executable program code instructions and/or data.

In an alternative implementation, the secondary memory 910 may additionally, or alternatively, include other similar means for allowing computer programs or other instructions to be loaded into the computing device 900. Such means can include, for example, a removable storage unit 922 and an interface 920. Examples of a removable storage unit 922 and interface 920 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 922 and interfaces 920 which allow software and data to be transferred from the removable storage unit 922 to the computer system 900.

The computing device 900 also includes at least one communication interface 924. The communication interface 924 allows software and data to be transferred between computing device 900 and external devices via a communication path 926. In various embodiments of the disclosures, the communication interface 924 permits data to be transferred between the computing device 900 and a data communication network, such as a public data or private data communication network. The communication interface 924 may be used to exchange data between different computing devices 900 which such computing devices 900 form part of an interconnected computer network. Examples of a communication interface 924 can include a modem, a network interface (such as an Ethernet card), a communication port (such as a serial, parallel, printer, GPIB, IEEE 1394, RJ25, USB), an antenna with associated circuitry, and the like. The communication interface 924 may be wired or may be wireless. Software and data transferred via the communication interface 924 are in the form of signals which can be electronic, electromagnetic, optical or other signals capable of being received by communication interface 924. These signals are provided to the communication interface via the communication path 926.

As shown in FIG. 9, the computing device 900 further includes a display interface 902 which performs operations for rendering images to an associated display 930 and an audio interface 932 for performing operations for playing audio content via associated speaker(s) 934.

As used herein, the term "computer program product" may refer, in part, to removable storage medium 918, removable storage unit 922, a hard disk installed in storage drive 912, or a carrier wave carrying software over communication path 926 (wireless link or cable) to communication interface 924. Computer readable storage media refers to any non-transitory, non-volatile tangible storage medium that provides recorded instructions and/or data to the computing device 900 for execution and/or processing. Examples of such storage media include magnetic tape, CD-ROM, DVD, Blu-Ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card, such as a SD card and the like, whether or not such devices are internal or external of the computing device 900. Examples of transitory or non-tangible computer readable transmission media that may also participate in the provision of software, application programs, instructions and/or data to the computing device 900 include radio or infra-red transmission channels as well as a network connection to another computer or networked device, and the Internet or Intranets, including e-mail transmissions and information recorded on Websites, and the like.

The computer programs (also called computer program code) are stored in main memory 908 and/or secondary memory 910. Computer programs can also be received via the communication interface 924. Such computer programs, when executed, enable the computing device 900 to perform one or more features of embodiments discussed herein. In various embodiments, the computer programs, when executed, enable the processor 904 to perform features of the above-described embodiments. Accordingly, such computer programs represent controllers of the computer system 900.

Software may be stored in a computer program product and loaded into the computing device 900 using the removable storage drive 914, the storage drive 912, or the interface 920. Alternatively, the computer program product may be downloaded to the computer system 900 over the communications path 926. The software, when executed by the processor 904, causes the computing device 900 to perform functions of embodiments described herein.

It is to be understood that the embodiment of FIG. 9 is presented merely by way of example. Therefore, in some embodiments, one or more features of the computing device 900 may be omitted. Also, in some embodiments, one or more features of the computing device 900 may be combined together. Additionally, in some embodiments, one or more features of the computing device 900 may be split into one or more component parts.

For example, the method of FIG. 2 or FIG. 12 may be implemented as software and stored in a non-transitory fashion in the secondary memory 910 or the removable storage units 918, 922 of the computer device 900.

In an implementation, the payment network server 108 may be generally described as a physical device comprising at least one processor 1002 and at least one memory 1004 including computer program code. The at least one memory 1004 and the computer program code are configured to, with the at least one processor 1002, cause the physical device to perform the operations described in FIG. 2 or FIG. 12. An example of the payment network server 108 is shown in FIG. 10.

Figure 16:
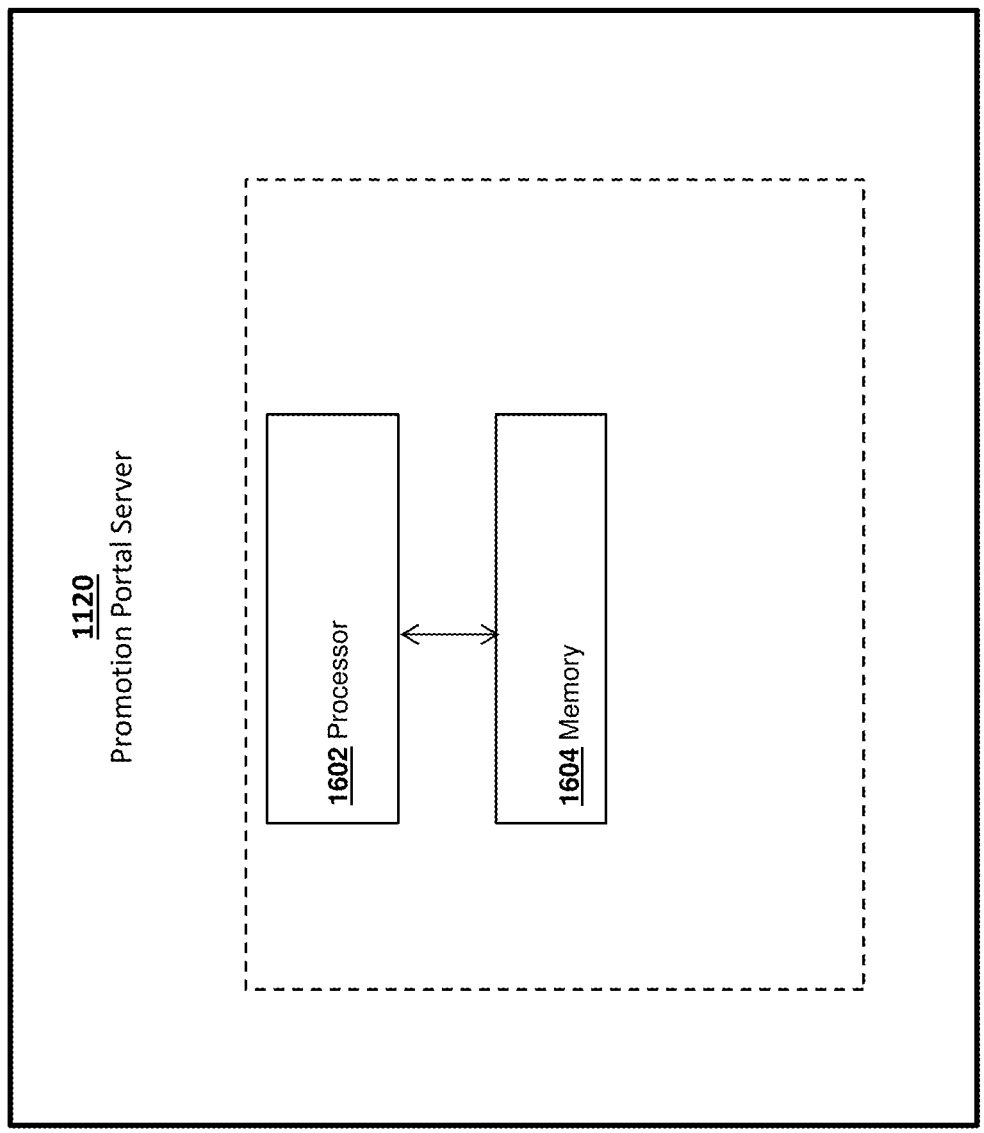
FIG. 16 shows an exemplary computing device to realize a server for the promotion portal server shown in FIGS. 11A and 11B.

In an implementation, the promotion portal server 1120 may be generally described as a physical device comprising at least one processor 1602 and at least one memory 1604 including computer program code. The at least one memory 1604 and the computer program code are configured to, with the at least one processor 1602, cause the physical device to perform the operations described in FIG. 12. An example of the promotion portal server 1120 is shown in FIG. 16.

It will be appreciated by a person skilled in the art that numerous variations and/or modifications may be made to the present disclosure as shown in the specific embodiments without departing from the spirit or scope of the disclosure as broadly described. For example, the above description mainly discusses the use of a Bluetooth connection, but it will be appreciated that another type of secure wireless connection, such as Wi-Fi, can be used in alternate embodiments to implement the method. Some modifications, e.g. adding an access point, changing the log-in routine, etc., may be considered and incorporated. The present embodiments are, therefore, to be considered in all respects to be illustrative and not restrictive.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A server comprising:
   at least one processor; and
   at least one memory including computer program code;
   the at least one memory and the computer program code configured to, with the at least one processor, cause the server to:
   receive, directly from a Payment Service Provider (PSP) device that is separate and distinct from the server, a promotion Application Programming Interface (API) call comprising a transaction request including a primary account number (PAN) associated with an account corresponding to a user, the promotion API call established through a connectivity between the PSP device and the server,
   in response to the PAN becoming eligible for one or more promotions, receive, from at least one of an issuer server electronically connected to the server or a payment facilitator server electronically connected to the server, an electronic indication message indicating that the PAN is eligible for the one or more promotions,
   in response to receiving the electronic indication message, transmit, to a database of promotions electronically connected to the server, an updating message to update, in the database of promotions, a range of one or more PANs eligible for the one or more promotions to include the PAN associated with the account,
   determine that the account indicated by the PAN in the transaction request is eligible for a promotion transaction associated with at least one promotion of the one or more promotions in response to receiving the transaction request and based on the PAN being within the range of one or more PANs eligible for the one or more promotions, and
   transmit, to a promotion platform electronically connected to the server, the transaction request configured to enable the server to receive a selection of at least one promotion of the one or more promotions from an electronic device associated with the user in response to determining that the account is eligible for the promotion transaction.

2. The server of claim 1, wherein the at least one memory, the computer program code, and the at least one processor, in response to transmitting the transaction request to the promotion platform, are configured to cause the server to:
   receive, from the promotion platform, one or more promotion options, the one or more promotion options presenting a choice to participate in the at least one promotion of the one or more promotions; and
   transmit a promotion option message including the one or more promotion options to the PSP device.

3. The server of claim 2, wherein the at least one memory and the computer program code are configured to, with the at least one processor, cause the server to:
   receive, from the PSP device, a user reply, in response to receiving the promotion option message, the user reply indicating an interest to participate in the at least one promotion of the one or more promotions; and
   forward the transaction request to the issuer server indicated when the user reply indicates the interest to participate in the at least one promotion of the one or more promotions.

4. The server of claim 3, wherein the at least one memory and the computer program code are configured to, with the at least one processor, cause the server to:
   transmit the transaction request to the issuer server indicated when the user reply does not indicate the interest to participate in the at least one promotion of the one or more promotions.

5. The server of claim 1, wherein the server is an Extensible Markup Language (XML) Gateway.

6. The server of claim 1, wherein the server is a payment network server.

7. The server of claim 1, wherein the electronic device is integrated into the PSP device.

8. The server of claim 1, wherein the electronic device is a mobile device.

9. The server of claim 1, wherein when the account indicated in the transaction request is eligible for the promotion transaction, the promotion transaction is configured to be applied to the transaction request before completing a transaction associated with the transaction request.

10. A method implemented by a server computing device for determining if an account corresponding to a user is eligible for one or more promotions, the method comprising:
    receiving, by the server computing device, directly from a Payment Service Provider (PSP) device that is separate and distinct from the server computing device, a promotion Application Programming Interface (API) call comprising a transaction request including a primary account number (PAN) associated with the account, the promotion API call established through a connectivity between the PSP device and the server computing device;
    in response to the PAN becoming eligible for the one or more promotions, receiving, by the server computing device and from at least one of an issuer server electronically connected to the server computing device or a payment facilitator server electronically connected to the server computing device, an electronic indication message indicating that the PAN has become eligible for the one or more promotions;

in response to receiving the electronic indication message, transmitting, to a database of promotions electronically connected to the server, an updating message to update, in the database of promotions, a range of one or more PANs eligible for the one or more promotions to include the PAN associated with the account;

determining, by the server computing device, that the account indicated by the PAN in the transaction request is eligible for a promotion transaction associated with at least one promotion of the one or more promotions in response to receiving the transaction request and based on the PAN being within the range of one or more PANs eligible for the one or more promotions; and transmitting, by the server computing device and to a promotions platform electronically connected to the server computing device, the transaction request configured to enable the server computing device to receive a selection of at least one promotion of the one or more promotions from an electronic device associated with the user in response to determining that the account is eligible for the promotion transaction.

11. The method according to claim 10, the method further comprising:

receiving, by the server computing device and from the promotion platform, one or more promotion options, the one or more promotion options presenting a choice to participate in the at least one promotion of the one or more promotions; and transmitting a promotion option message including the one or more promotion options to the PSP device.

12. The method according to claim 11, further comprising:

receiving, by the server computing device and from the PSP device, a user reply, in response to receiving the promotion option message, the user reply indicating an interest to participate in the at least one promotion of the one or more promotions; and forwarding, by the server computing device, the transaction request to the issuer server indicated when the user reply indicates the interest to participate in the at least one promotion of the one or more promotions.

13. The method according to claim 12, further comprising:

transmitting, by the server computing device, the transaction request to the issuer server indicated when the user reply does not indicate the interest to participate in the at least one promotion of the one or more promotions.

14. The method according to claim 10, wherein the server computing device comprises an Extensible Markup Language (XML) Gateway.

15. The method according to claim 10, wherein the server computing device comprises a payment network server.

16. The method of claim 10, wherein the electronic device is integrated into the PSP device.

17. The method of claim 10, wherein the electronic device is a mobile device.

18. The method of claim 10, wherein when the account indicated in the transaction request is eligible for the promotion transaction, the promotion transaction is configured to be applied to the transaction request before completing a transaction associated with the transaction request.

* * * * *